(12) United States Patent
Yoo et al.

(10) Patent No.: US 11,477,440 B2
(45) Date of Patent: Oct. 18, 2022

(54) IMAGE PREDICTION METHOD AND APPARATUS PERFORMING INTRA PREDICTION

(71) Applicant: LG ELECTRONICS INC., Seoul (KR)

(72) Inventors: Sunmi Yoo, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/276,786

(22) PCT Filed: Sep. 19, 2019

(86) PCT No.: PCT/KR2019/012154
§ 371 (c)(1),
(2) Date: Mar. 16, 2021

(87) PCT Pub. No.: WO2020/060233
PCT Pub. Date: Mar. 26, 2020

(65) Prior Publication Data
US 2021/0360226 A1    Nov. 18, 2021

Related U.S. Application Data

(60) Provisional application No. 62/734,240, filed on Sep. 20, 2018.

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/132* (2014.11);
(Continued)

(58) Field of Classification Search
CPC .... H04N 19/82; H04N 19/105; H04N 19/117; H04N 19/132; H04N 19/159; H04N 19/176
See application file for complete search history.

(56) References Cited

U.S. PATENT DOCUMENTS

2013/0287114 A1    10/2013  Arevalo Baeza et al.
2016/0373743 A1*   12/2016  Zhao ................. H04N 19/139
(Continued)

FOREIGN PATENT DOCUMENTS

KR          10-1615503 B1     4/2016
KR          10-1772459 B1     8/2017
KR      10-2018-0019566 A     2/2018

*Primary Examiner* — Dave Czekaj
*Assistant Examiner* — Shanika M Brumfield
(74) *Attorney, Agent, or Firm* — Dentons US LLP

(57) ABSTRACT

An image decoding method according to the present document comprises the steps of: generating a prediction sample for the current block on the basis of an intra prediction mode for the current block and neighboring reference samples; and generating a reconstructed picture for the current block on the basis of the prediction sample, wherein, when the reference sample position indicated by a prediction direction of a directional prediction mode of the current block from the position of the prediction sample is the fractional sample position, the prediction sample is derived from among the neighboring reference samples by interpolating with respect to specific neighboring reference samples located around the fractional sample position, when the specific neighboring reference samples include outer neighboring reference samples located at (2*nW+1, −1) and (2*nW+2, −1) positions, the values of the outer neighboring reference samples are set to be equal to the value of a sample located at (2*nW, −1), and nW may indicate the width of the current block.

10 Claims, 23 Drawing Sheets

(51) Int. Cl.
   *H04N 19/132* (2014.01)
   *H04N 19/159* (2014.01)
   *H04N 19/176* (2014.01)
   *H04N 19/82* (2014.01)

(52) U.S. Cl.
   CPC ......... *H04N 19/159* (2014.11); *H04N 19/176* (2014.11); *H04N 19/82* (2014.11)

(56) References Cited

U.S. PATENT DOCUMENTS

| | | |
|---|---|---|
| 2018/0249156 A1 | 8/2018 | Heo et al. |
| 2019/0208198 A1* | 7/2019 | Pettersson ............ H04N 19/159 |
| 2020/0007870 A1* | 1/2020 | Ramasubramonian ...................... H04N 19/176 |
| 2020/0137401 A1* | 4/2020 | Kim ....................... H04N 19/86 |
| 2020/0244956 A1* | 7/2020 | Lee ...................... H04N 19/176 |
| 2021/0176492 A1* | 6/2021 | Kim ....................... H04N 19/46 |

* cited by examiner

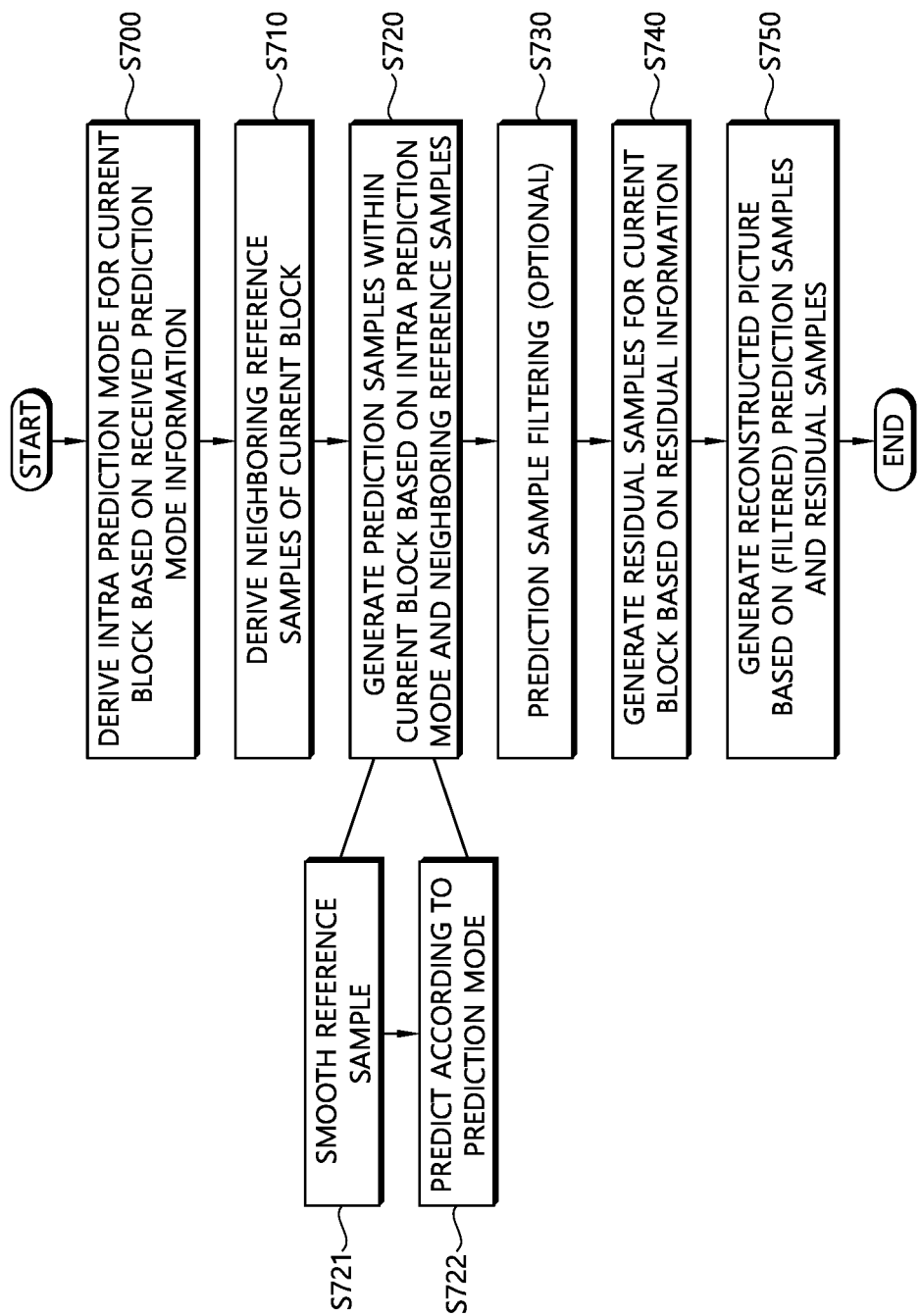

FIG. 14
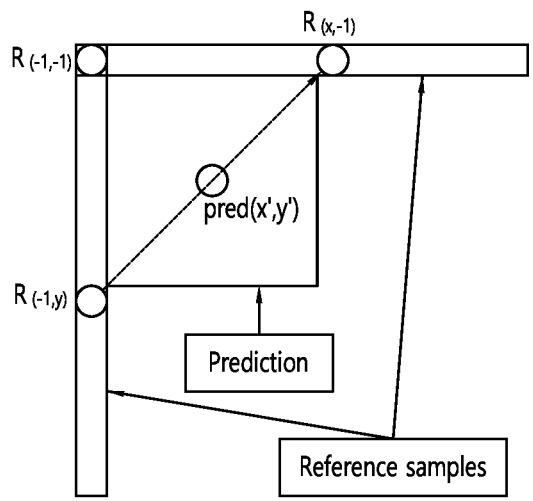
(a) Diagonal top-right mode
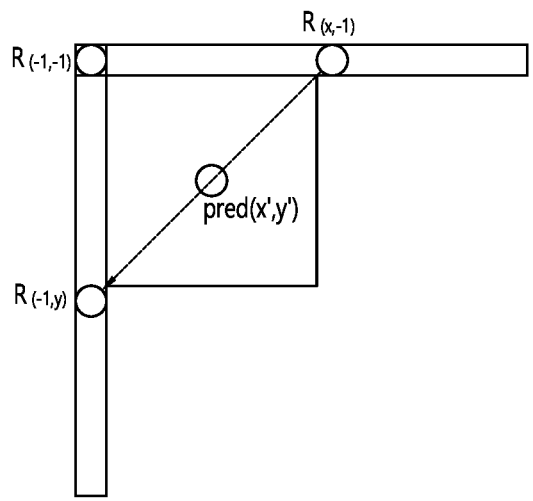
(b) Diagonal bottom-left mode
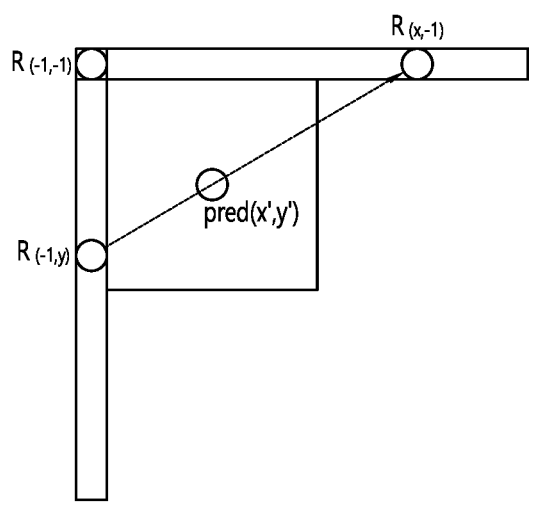
(c) Adjacent diagonal top-right mode
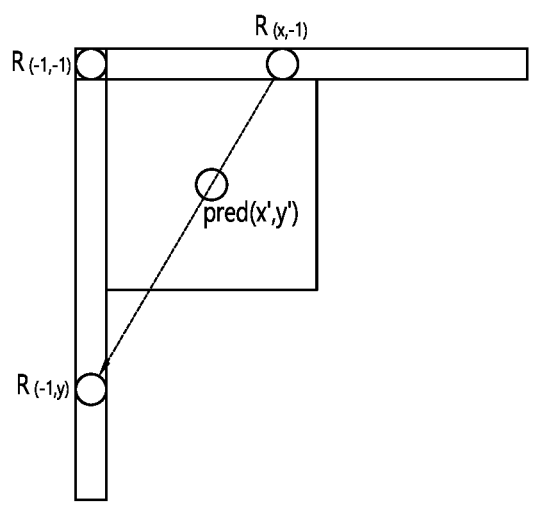
(d) Adjacent diagonal bottom-left mode

FIG. 16
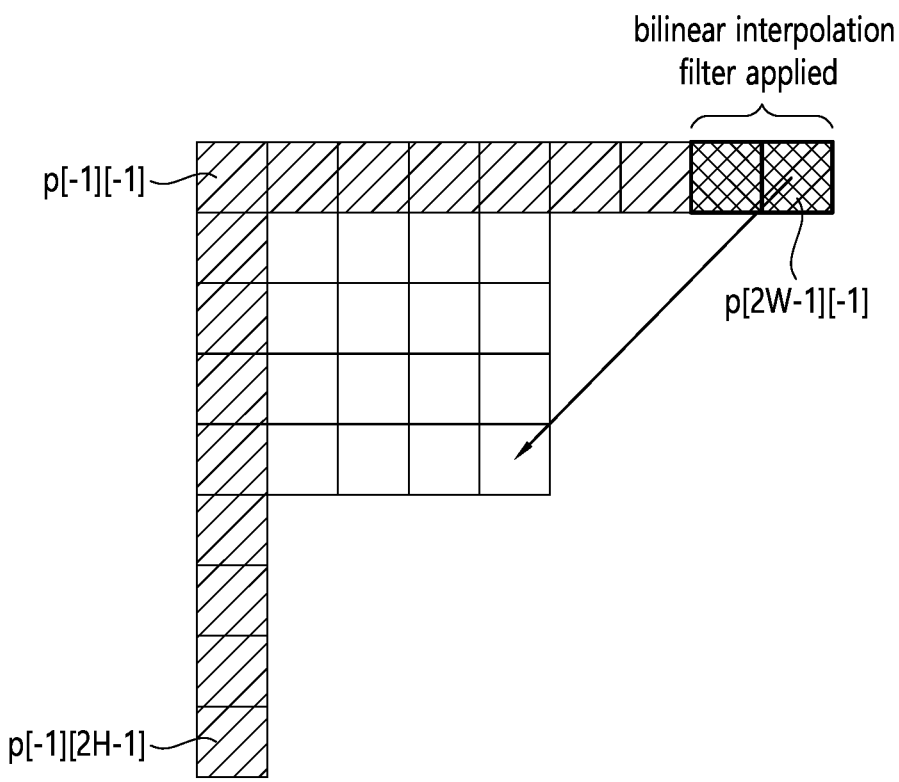
 : RECONSTRUCTED NEIGHBORING SAMPLE DESIGNATED AS REFERENCE SAMPLE OR SEPARATELY STORED
 : CURRENT PREDICTION BLOCK SAMPLE
 : SAMPLE FOR REFERENCE IN INTERPOLATION

FIG. 18

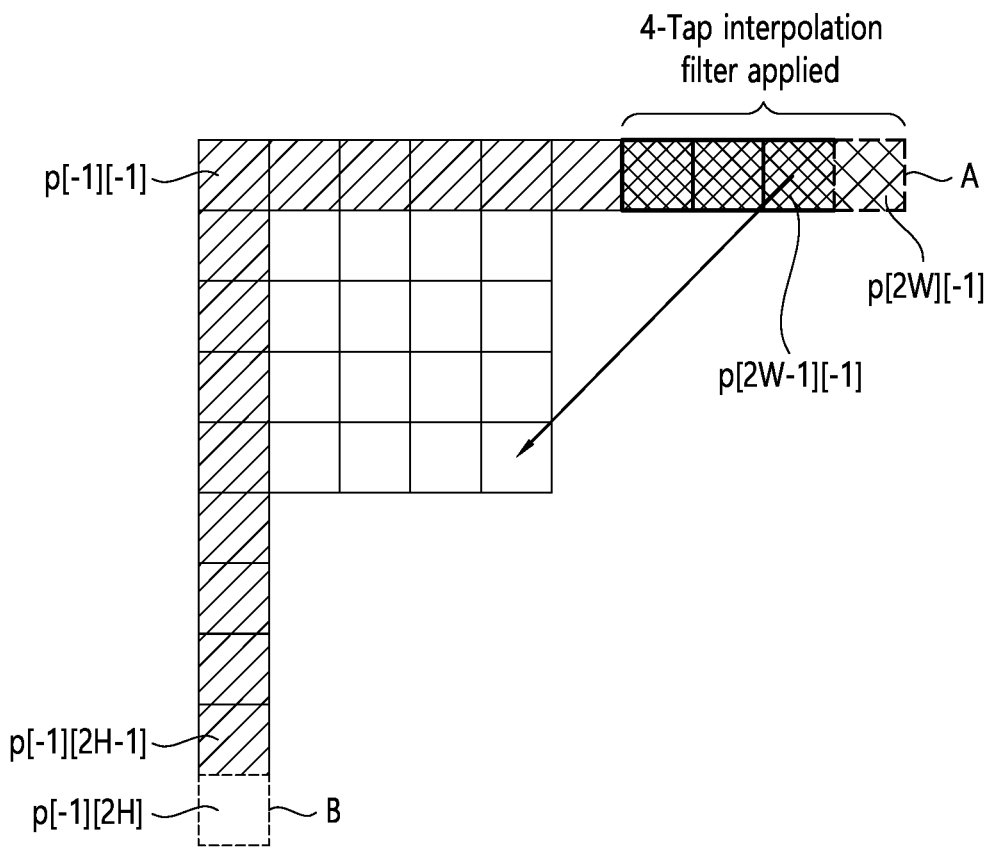

☒ : RECONSTRUCTED NEIGHBORING SAMPLE DESIGNATED AS REFERENCE SAMPLE OR SEPARATELY STORED

☐ : CURRENT PREDICTION BLOCK SAMPLE

▦ : RECONSTRUCTED SAMPLE USED FOR REFERENCE IN INTERPOLATION BUT NOT DESIGNATED AS REFERENCE SAMPLE IN APPLICATION OF CONVENTIONAL

⌐ ¬ : RECONSTRUCTED SAMPLE NOT DESIGNATED AS REFERENCE SAMPLE IN APPLICATION OF CONVENTIONAL ART

▦ : SAMPLE FOR REFERENCE IN INTERPOLATION

IMAGE PREDICTION METHOD AND APPARATUS PERFORMING INTRA PREDICTION

CROSS-REFERENCE TO RELATED APPLICATIONS

This application is the National Stage filing under 35 U.S.C. 371 of International Application No. PCT/KR2019/012154, filed on Sep. 19, 2019, which claims the benefit of U.S. Provisional Application No. 62/734,240 filed on Sep. 20, 2018, the contents of which are all hereby incorporated by reference herein in their entirety.

BACKGROUND OF THE DISCLOSURE

Field of the Disclosure

The present disclosure relates generally to an image coding technology and, more particularly, to an image coding method based on intra prediction and an apparatus therefor.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

A technical aspect of the present disclosure is to provide a method and an apparatus for increasing image coding efficiency.

Another technical aspect of the present disclosure is to provide an intra prediction method and an intra prediction apparatus for extending a reference sample when generating a prediction sample.

Still another technical aspect of the present disclosure is to provide an intra prediction method and an intra prediction apparatus for generating a reference filter according to the application of an interpolation filter when generating a prediction sample.

Yet another technical aspect of the present disclosure is to provide an image coding method and an image coding apparatus for increasing the precision of intra prediction.

According to an embodiment of the present disclosure, there may be provided an image decoding method performed by a decoding apparatus, the method including: deriving an intra prediction mode for a current block; deriving neighboring reference samples of the current block; generating a prediction sample for the current block based on the intra prediction mode and the neighboring reference samples; and generating a reconstructed picture for the current block based on the prediction sample, wherein the intra prediction mode for the current block may be a directional prediction mode, the prediction sample may be derived based on interpolation of specific neighboring reference samples located adjacent to a position of a fractional sample among the neighboring reference samples based on a position of a reference sample indicated by a prediction direction of the directional prediction mode from a position of the prediction sample being the position of the fractional sample, the values of outer neighboring reference samples may be set to be the same as a value of a sample of (2*nW, −1) when the specific neighboring reference samples include the outer neighboring reference samples at positions of (2*nW+1, −1) and (2*nW+2, −1), and wherein W may be a width of the current block.

According to another embodiment of the present disclosure, there may be provided an image encoding method performed by an encoding apparatus, the method including: deriving an intra prediction mode for a current block; deriving neighboring reference samples of the current block; generating a prediction sample for the current block based on the intra prediction mode and the neighboring reference samples; and generating a reconstructed picture for the current block based on the prediction sample, wherein the intra prediction mode for the current block may be a directional prediction mode, the prediction sample may be derived based on interpolation of specific neighboring reference samples located adjacent to a position of a fractional sample among the neighboring reference samples based on a position of a reference sample indicated by a prediction direction of the directional prediction mode from a position of the prediction sample being the position of the fractional sample, values of outer neighboring reference samples may be set to be the same as a value of a sample of (2*nW, −1) when the specific neighboring reference samples include the outer neighboring reference samples at positions of (2*nW+1, −1) and (2*nW+2, −1), and nW may be a width of the current block.

According to still another embodiment of the present disclosure, there may be provided an image decoding apparatus for performing a decoding method, the apparatus including a predictor configured to: derive an intra prediction mode for a current block; derive neighboring reference samples of the current block; generate a prediction sample for the current block based on the intra prediction mode and the neighboring reference samples; and generate a reconstructed picture for the current block based on the prediction sample, wherein the intra prediction mode for the current block may be a directional prediction mode, the prediction sample may be derived based on interpolation of specific neighboring reference samples located adjacent to a position of a fractional sample among the neighboring reference samples based on a position of a reference sample indicated by a prediction direction of the directional prediction mode from a position of the prediction sample being the position of the fractional sample, values of outer neighboring reference samples may be set to be the same as a value of a sample of (2*nW, −1) when the specific neighboring reference samples comprise the outer neighboring reference samples at positions of (2*nW+1, −1) and (2*nW+2, −1), and W may be a width of the current block.

According to yet another embodiment of the present disclosure, there may be provided a digital storage medium which stores image data including encoded image information generated according to the image encoding method performed by the encoding apparatus.

According to still another embodiment of the present disclosure, there may be provided a digital storage medium which stores image data including encoded image information generated according to the image decoding method performed by the decoding apparatus.

According to an embodiment of the present disclosure, it is possible to increase general image/video compression efficiency.

According to an embodiment of the present disclosure, it is possible to effectively derive an intra prediction mode for extending a reference sample when generating a prediction sample.

According to an embodiment of the present disclosure, it is possible to derive a chroma prediction mode using an intra prediction mode for generating a reference filter according to the application of an interpolation filter when generating a prediction sample.

According to an embodiment of the present disclosure, it is possible to provide an image coding method and an image coding apparatus for increasing the precision of intra prediction.

BRIEF DESCRIPTION OF THE DRAWINGS

FIG. 7 is a control flowchart illustrating a decoding method that is applicable in intra prediction according to an embodiment of the present disclosure.

FIG. 14 is a diagram illustrating reference samples for PDPC according to an embodiment of the present disclosure.

FIG. 16 illustrates a neighboring sample for reference in bilinear interpolation according to an embodiment of the present disclosure.

FIG. 18 illustrates a neighboring sample for reference in 4-tap interpolation according to another embodiment of the present disclosure.

DESCRIPTION OF EMBODIMENTS

Figure 1:
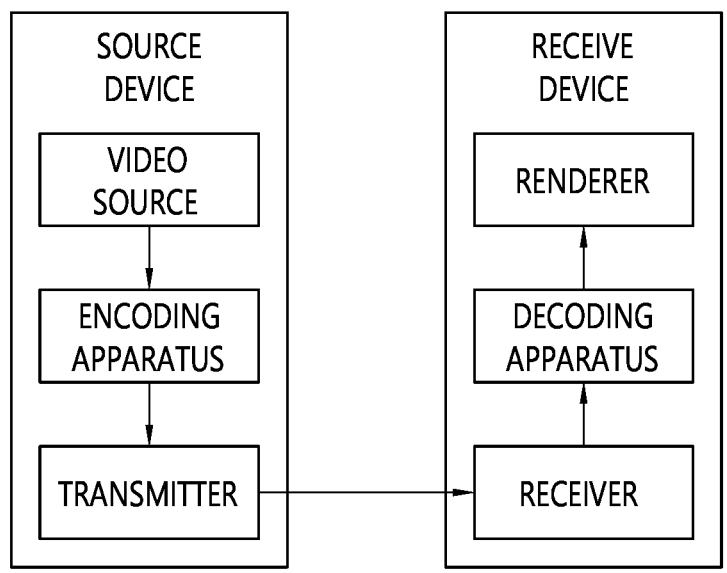
FIG. 1 schematically illustrates an example of a video/image coding system to which the present disclosure is applicable.

An exemplary embodiment of the present disclosure provides an image information decoding method performed by a decoding apparatus. The method includes: decoding a non-separable secondary transform (NSST) index from a bitstream, if an NSST is applied to a target block, decoding information about transform coefficients for the target block from the bitstream, based on the decoded NSST index, and deriving the transform coefficients for the target block based on the decoded information about the transform coefficients, in which the NSST index is decoded prior to the information about the transform coefficients for the target block.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure is applicable.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present disclosure relates to video/image coding. For example, a method/embodiment disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present disclosure suggests various embodiments of video/image coding, and the above embodiments may also be performed in combination with each other unless otherwise specified.

In the present disclosure, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In the present disclosure, a tile group and a slice may be used in place of each other. For example, in the present disclosure, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the symbol "/" and "," should be interpreted as "and/or." For example, the expression "A/B" is interpreted as "A and/or B", and the expression "A, B" is interpreted as "A and/or B." Additionally, the expression "A/B/C" means "at least one of A, B, and/or C." Further, the expression "A, B, C" also means "at least one of A, B, and/or C." (In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C.")

Additionally, in the present disclosure, the term "or" should be interpreted as "and/or." For example, the expression "A or B" may mean 1) only "A", 2) only "B", and/or 3) "both A and B." In other words, the term "or" in the present disclosure may mean "additionally or alternatively." (Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively.")

Figure 2:
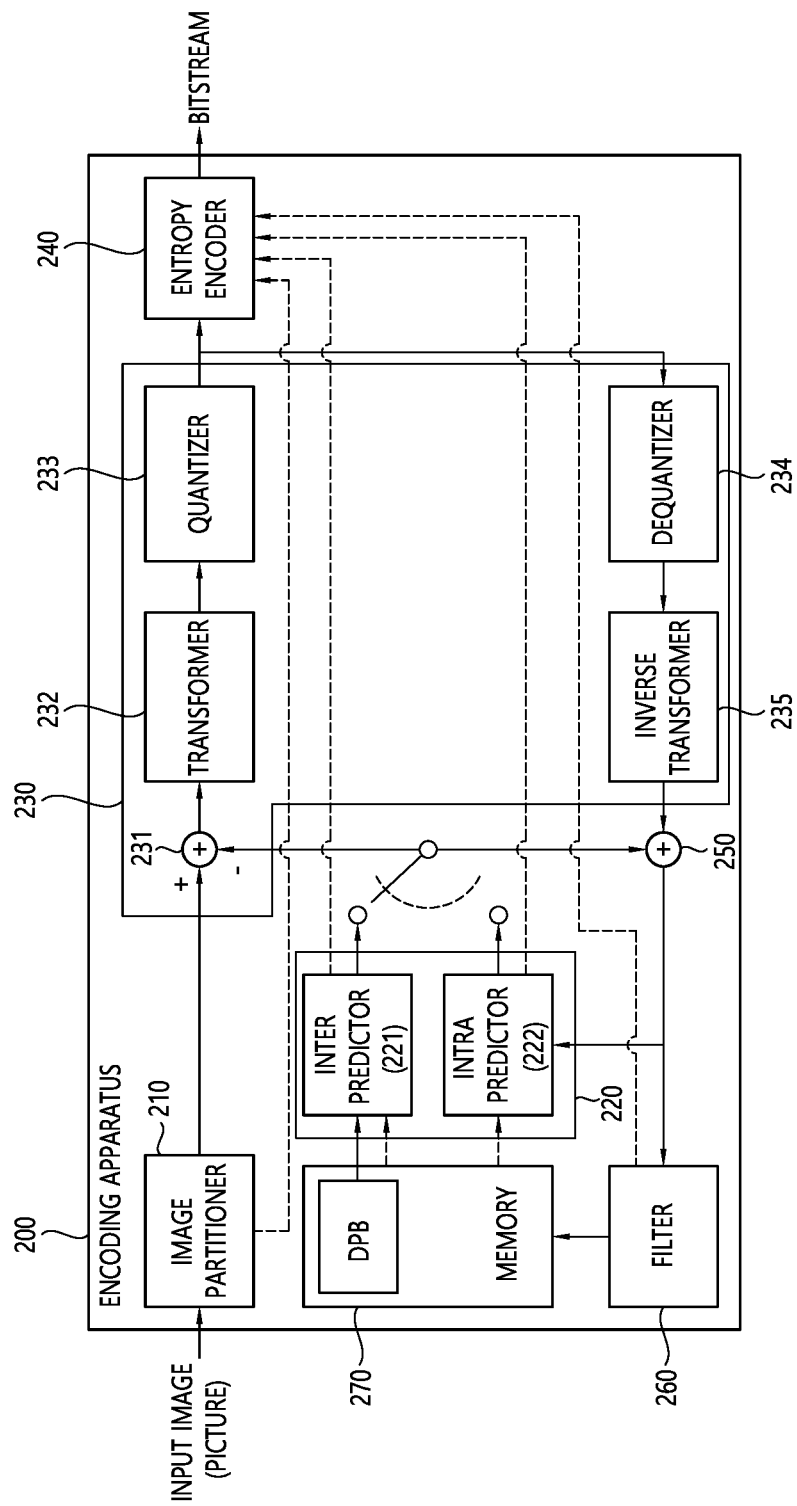
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present disclosure. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present disclosure may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
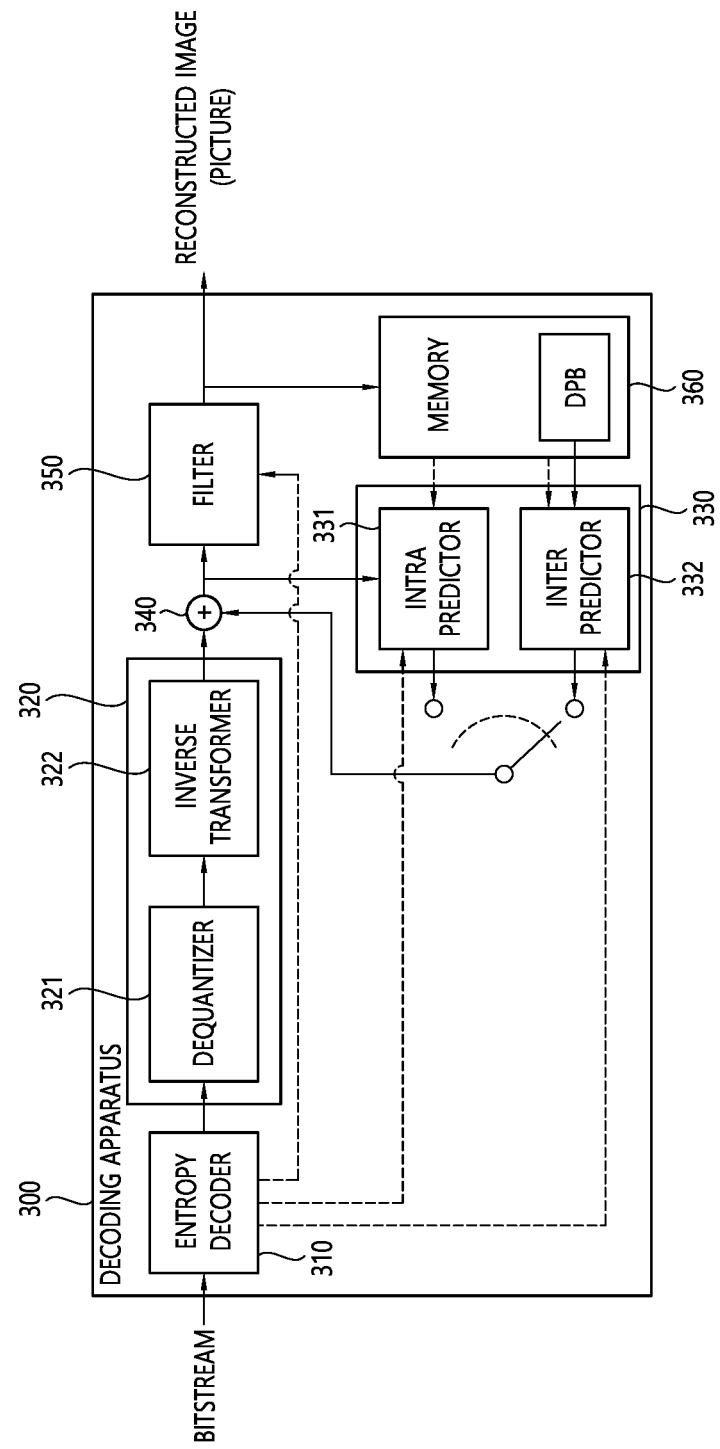
FIG. 3 is a diagram schematically illustrating a configuration of a video/image decoding apparatus to which the present disclosure is applicable.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present disclosure may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present disclosure may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present disclosure. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4A:
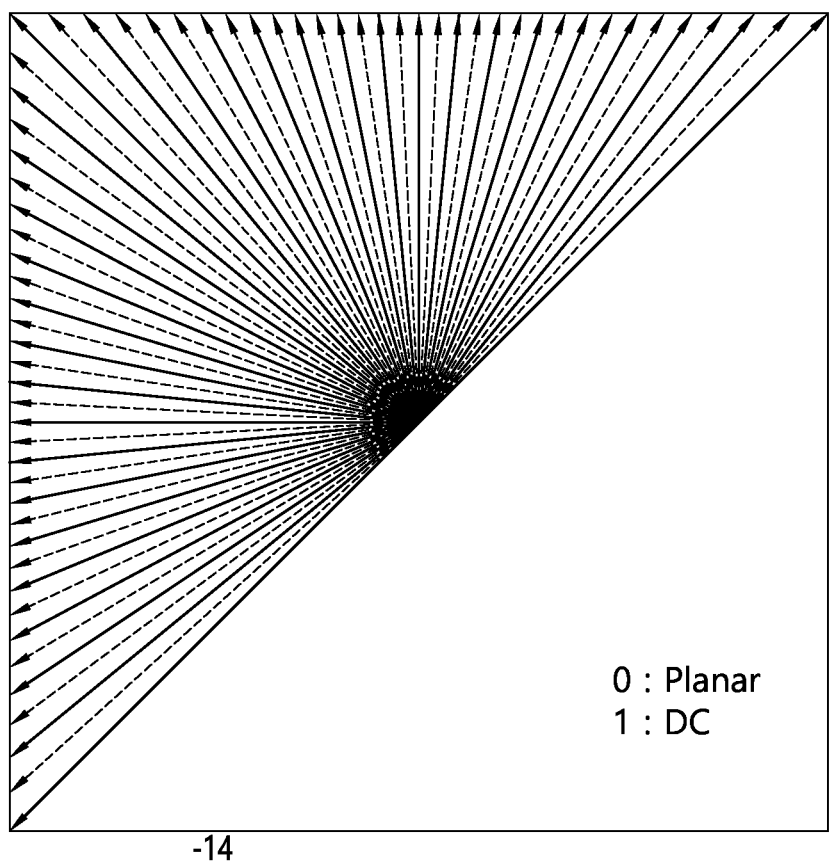
FIG. 4A is a diagram illustrating 67 intra prediction modes according to an embodiment of the present disclosure.
Figure 4B:
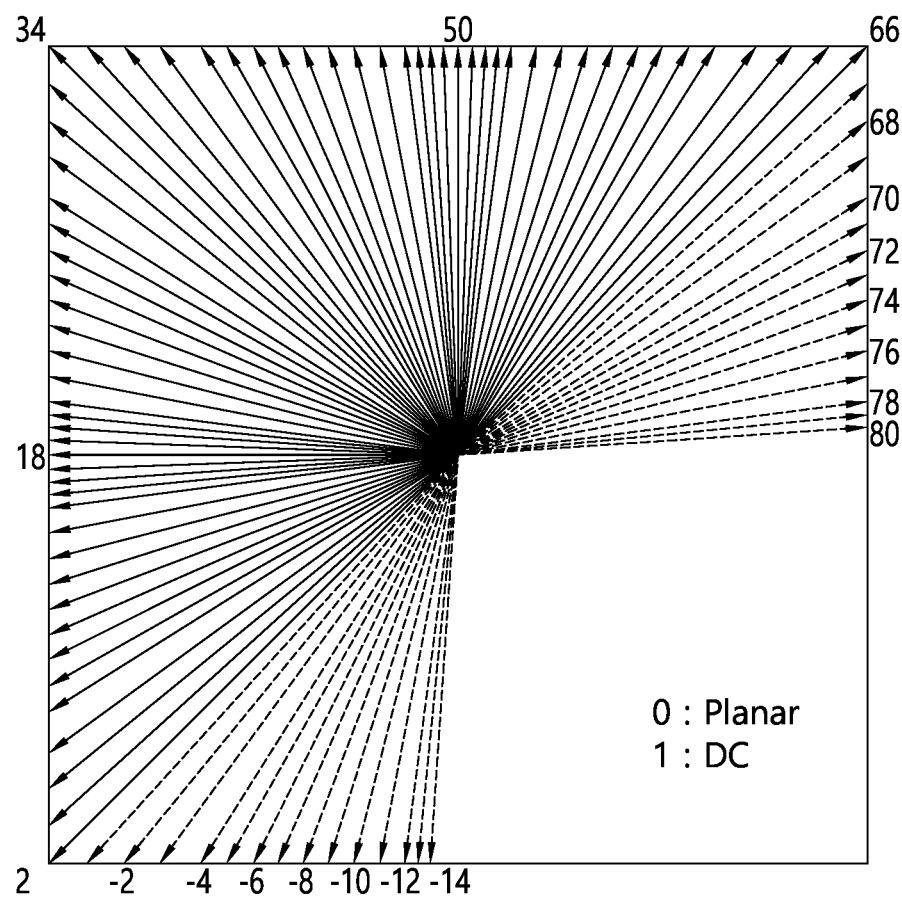
FIG. 4B is a diagram further illustrating wide-angle intra prediction modes according to an embodiment of the present disclosure.

FIG. 4A is a diagram illustrating 67 intra prediction modes according to an embodiment of the present disclosure, and FIG. 4B is a diagram further illustrating wide-angle intra prediction modes according to an embodiment of the present disclosure.

In intra prediction according to an embodiment of the present disclosure, 67 intra prediction modes as shown in FIG. 4A and Table 1 may be used.

TABLE 1

| Intra prediction mode | Associated name |
|---|---|
| 0 | Intra planar |
|  | Intra DC |
| 2, . . . , 66 | (INTRA_ANGULAR2 . . . INTRA_ANGULAR66) |

This is an extension of the existing 35 angular modes to 67 angular modes for intra-encoding and more accurate prediction of high-resolution image. Arrows represented by dotted lines in FIG. 4A indicate 32 newly added angular modes in the 35 angular modes. The intra planner (INTRA_PLANAR) mode and the intra DC (INTRA_DC) mode are the same as the existing intra planner mode and the existing intra DC mode. The added 32 angular modes may be applied to all block sizes, and may be applied to both intra encoding and decoding of the luminance (luma) component and the chrominance (chroma) component.

Referring to FIG. 4B, intra prediction mode 2 may represent a left downward diagonal direction, 34 may represent a left upward diagonal direction, and 66 may represent a right upward diagonal direction. In FIG. 4B, a vertical direction may be indicated with an intra prediction mode 50 and a horizontal direction may be indicated with intra prediction mode 18.

According to another embodiment of the present disclosure, intra prediction modes may include two non-directional intra prediction modes and 129 directional intra prediction modes. The non-directional intra prediction modes may include a planar intra prediction mode and a DC intra prediction mode, and the directional intra prediction modes may include intra prediction modes 2 to 130.

Figure 5:
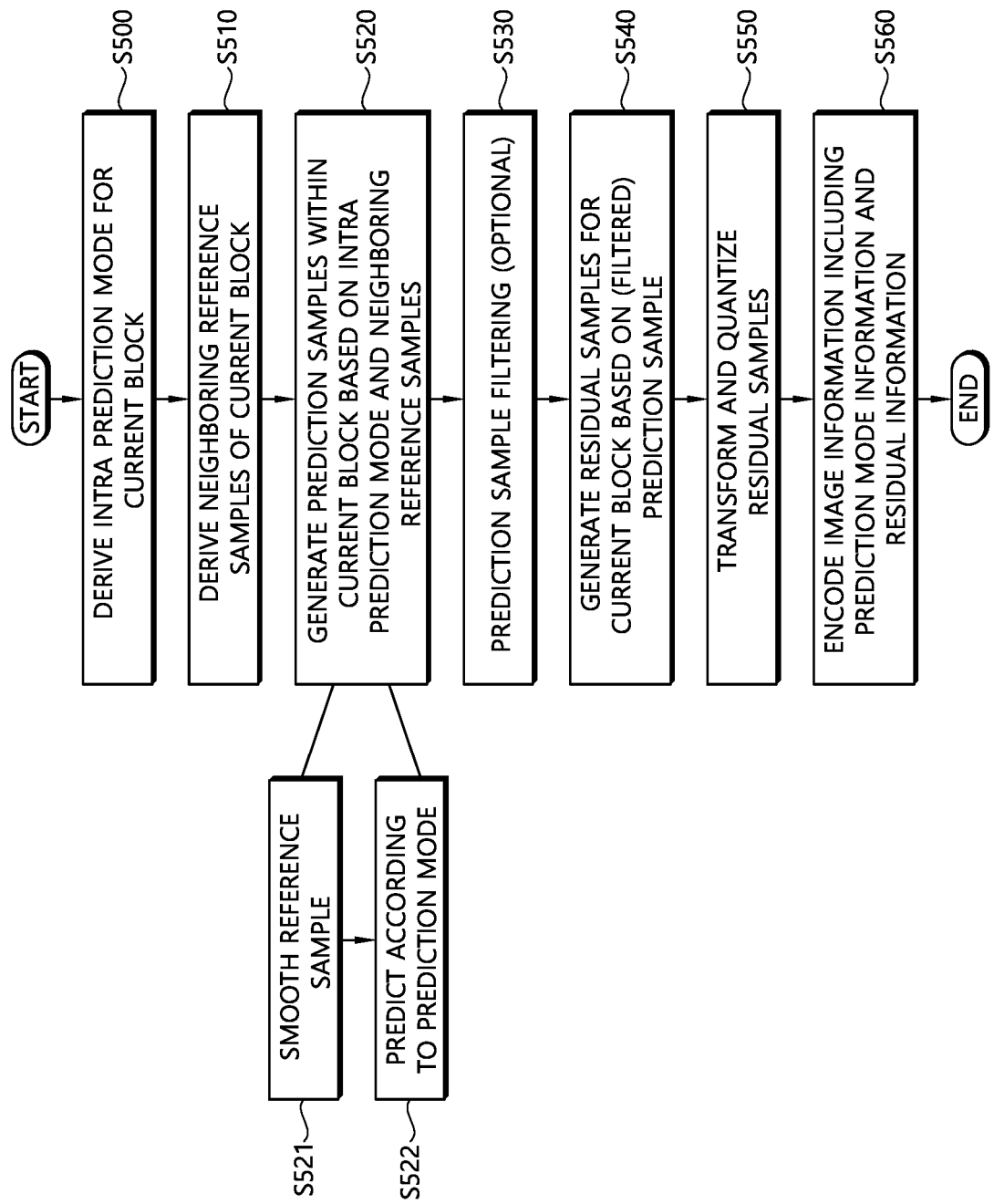
FIG. 5 is a control flowchart illustrating an encoding method that is applicable in intra prediction according to an embodiment of the present disclosure.

FIG. 5 is a control flowchart illustrating an encoding method that is applicable in intra prediction according to an embodiment of the present disclosure.

According to FIG. 5, the encoding apparatus may derive an intra prediction mode for a current block (S500), and derive neighboring reference samples of the current block (S510).

When reconstructing a block to which the intra prediction has been applied, the encoding apparatus constructs a prediction block using neighboring pixels of the block. In order to generate a prediction sample of the current block according to the prediction mode, neighboring pixels, that is, reference samples, need to be derived. When deriving a prediction sample by applying the intra prediction, the current block may be a transform block.

Assuming that the size of the current block is N, the maximum size of the reference pixel to which reference may be made when performing the intra prediction may be 2N pixels adjacent to the top, 2N pixels adjacent to the left side, and a corner pixel in the top-left corner.

Figure 6:
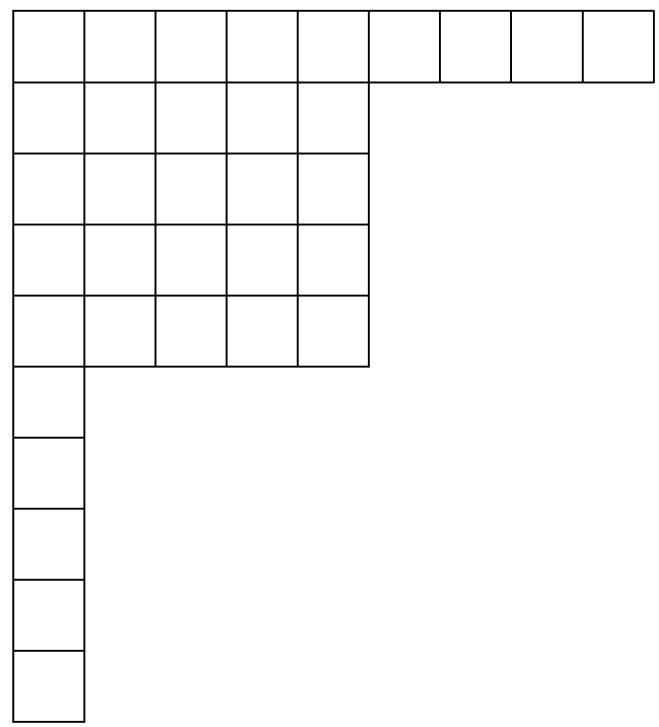
FIG. 6 is a diagram illustrating an example of a reference pixel that may be used for intra prediction.

FIG. 6 is a diagram illustrating an example of a reference pixel that may be used for intra prediction.

As illustrated, when the intra prediction is performed on a 4×4 block, neighboring samples to which reference may be made are 2N(8) samples adjacent to the top of the 4×4 block, 2N(8) samples adjacent to the left side, and a corner sample in the top-left corner.

Reference samples to which reference is made for prediction may be subjected to smoothing processing depending on the size and sample value of the current block. This is to prevent in advance a visual artifact of a prediction block to be derived due to a difference between reference samples.

The encoding apparatus generates prediction samples within the current block based on the intra prediction mode and the neighboring reference samples (S520).

The method used when predicting an intra block by using reference samples adjacent to the current block may be generally classified into two kinds of methods, that is, an angular prediction method in which a prediction block is constructed by copying reference samples located along a specific direction, and a non-angular prediction method (DC mode, planner mode) in which as many reference pixels as can be referenced are utilized.

The angular prediction method was devised to express the structure of various directions that may appear on the screen. The angular prediction method may be performed by designating a specific direction as a mode as shown in FIG. 4 below, and then copying reference samples corresponding to the prediction mode angle around the position of the sample to be predicted.

When it is impossible to make reference to a reference pixel in integer-pixel units, the prediction block may be constructed by copying a pixel interpolated using two integer samples and the distance ratio between the two integer pixels obtained by an angle between the two integer samples.

As illustrated in FIG. 5, the encoding apparatus may set a reference sample and may interpolate, that is, smooth, the value of the reference sample for a fractional sample in order to perform prediction (S521).

When smoothing for the reference sample is completed, that is, fractional samples for the prediction are calculated, prediction according to the intra mode, that is, a prediction direction, may be performed on the current block (S522).

After performing the prediction according to the prediction direction, the encoding apparatus may perform a prediction sample filtering procedure (S530).

Prediction sample filtering may be referred to as post filtering. Some or all of the prediction samples may be filtered by the prediction sample filtering procedure. When necessary, S530 may be omitted.

The encoding apparatus generates residual samples for the current block based on the (filtered) prediction sample (S540).

Thereafter, the residual samples may be transformed and quantized (S550).

The encoding apparatus may encode image information including prediction mode information indicating the intra prediction mode and residual information on the residual samples (i.e., the transformed and quantized residual samples) (S560).

The encoding apparatus may output the encoded image information in the form of a bitstream. The output bitstream may be forwarded to a decoding apparatus through a storage medium or a network.

FIG. 7 is a control flowchart illustrating a decoding method that is applicable to intra prediction according to an embodiment of the present disclosure.

The decoding apparatus may perform an operation corresponding to the operation which has been performed in the encoding apparatus. The decoding apparatus may derive an intra prediction mode for the current block based on the received prediction mode information (S700).

The decoding apparatus may derive neighboring reference samples of the current block (S710).

When reconstructing a block to which the intra prediction has been applied, the decoding apparatus constructs a prediction block using neighboring pixels of the block, and combines it with the residual signal transmitted from the encoding apparatus. In order to generate a prediction sample of the current block according to the prediction mode, neighboring pixels, that is, reference samples, needs to be derived.

For example, assuming that the size of the current block is N, the maximum size of the reference pixel to which reference may be made when performing the intra prediction may be 2N pixels adjacent to the top, 2N pixels adjacent to the left side, and a corner pixel in the top-left corner.

The decoding apparatus generates prediction samples within the current block based on the intra prediction mode and the neighboring reference samples (S720).

When it is not possible to make reference to a reference pixel in integer-pixel units, as shown in FIG. 7, the prediction block may be constructed by copying a pixel interpolated using two corresponding pixels and the distance ratio between the two pixels obtained by an angle.

In order to predict a position of a fractional sample, an interpolation filter from integer pixels, that is, integer samples, needs to be used. The interpolation filter may be selectively determined depending on the size of the current block. When the width or height of the current block is less than or equal to 8, a cubic filter may be used, while, when the width or height of the current block is greater than or equal to 8, a Gaussian filter may be applied.

In addition, according to an example, the angular prediction mode may be classified into a vertical direction prediction mode if it is greater than or equal to the mode of no. 34 in FIG. 4, which is a reference, or into a horizontal direction prediction mode if it is less than the mode of no. 34 in FIG. 4. In the vertical direction prediction mode, the selection of the interpolation filter may be based on the width of the block, and in the horizontal direction prediction mode, the selection of the interpolation filter may be based on the height of the block.

Meanwhile, a DC mode, which is one of the non-angular modes, is a method of constructing a prediction block with an average value of reference pixels (reference samples) located adjacent to the current block. If the pixels within the current block are homogeneous, effective prediction can be expected. Contrarily, when the reference pixels have different values, discontinuity may occur between the prediction block and the reference sample. In a similar situation, even when predicting with the angular prediction method, unintended visual contouring may occur, and thus, the planar mode prediction method may be used to compensate for this. The planar mode prediction method is to construct the prediction block by performing horizontal linear prediction and vertical linear prediction using a reference pixel, and then by averaging them.

As shown FIG. 7, Summing up the steps of generating the prediction samples with reference to FIG. 7, the decoding apparatus may set a reference sample and interpolate, that is, smooth the reference pixel for the fractional sample in order to perform prediction (S721).

When smoothing for the reference sample is completed, that is, the fractional samples for the prediction are calculated, prediction according to the intra mode, that is, the prediction direction, may be performed on the current block (S722).

In this case, the decoding apparatus may perform a prediction sample filtering procedure (S730). Prediction sample filtering may be referred to as post filtering. Some or all of the prediction samples may be filtered by the prediction sample filtering procedure. When necessary, S730 may be omitted.

The decoding apparatus generates the residual samples for the current block based on the received residual information (S740).

The decoding apparatus may generate reconstructed samples for the current block based on the (filtered) prediction samples and the residual samples, and generate a reconstructed picture based on these reconstructed samples (S750).

As described above, the prediction direction of intra prediction may be defined to range from 45 degrees to −135 degrees in a clockwise direction. However, when the current block is a non-square block, some directional intra predictions modes may be adaptively replaced by a wide-angle intra prediction mode. When replaced wide-angle intra prediction is applied, information on previous intra prediction may be signaled, may be parsed, and may then be remapped to an index of the wide-angle intra prediction mode. Therefore, the total number of intra prediction modes for a specific block (e.g., a non-square block having a specific size) may not be changed, that is, the total number of intra prediction modes may be 67, and intra prediction mode coding for the specific block may not be changed.

Figure 8A:
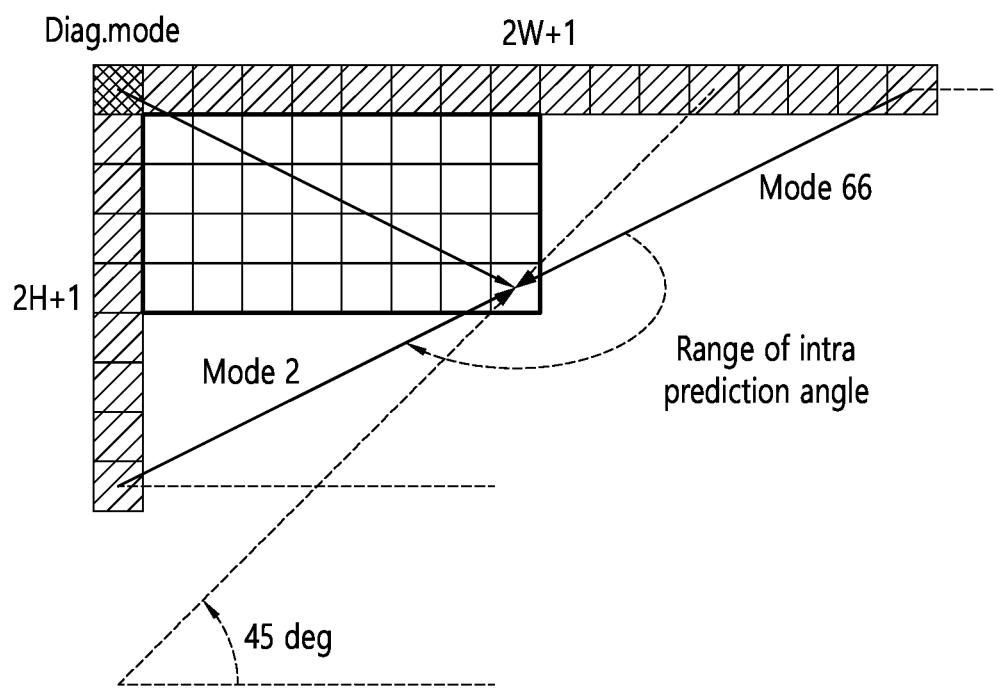
FIG. 8A and FIG. 8B are diagrams illustrating reference samples for a wide-angle intra prediction mode according to an embodiment of the present disclosure.
Figure 8B:
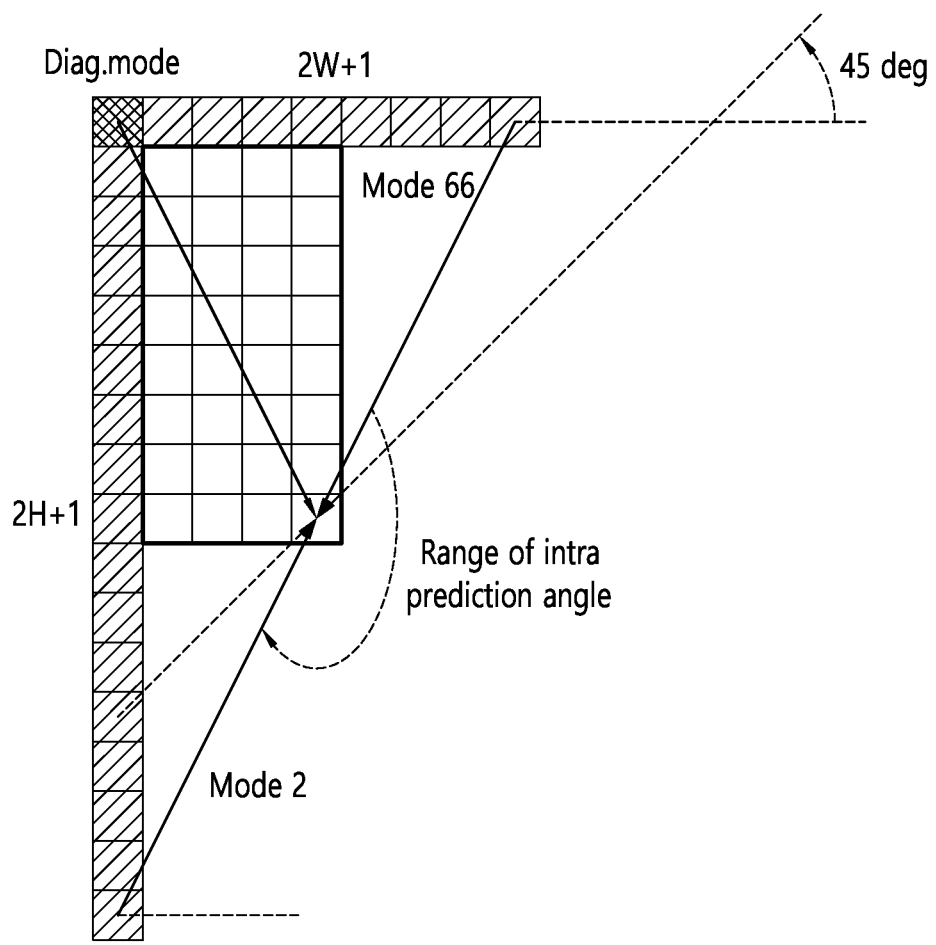

FIG. 8A and FIG. 8B illustrate reference samples for a wide-angle intra prediction mode according to an embodiment of the present disclosure. FIG. 8A illustrates a non-square block having a width longer than a height, and FIG. 8B illustrates a non-square block having a height longer than a width.

As illustrated, top reference samples having a length of 2W+1 and left reference samples having a length of 2H+1 may be defined in order to support a wide-angle prediction direction. When wide-angle intra prediction is applied, intra prediction modes replaced by the wide-angle intra prediction mode may be different depending on the aspect ratio of a current block. The intra prediction modes replaced by the wide-angle intra prediction mode depending on the aspect ratio may be derived as illustrated in the following table.

TABLE 2

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Figure 9:
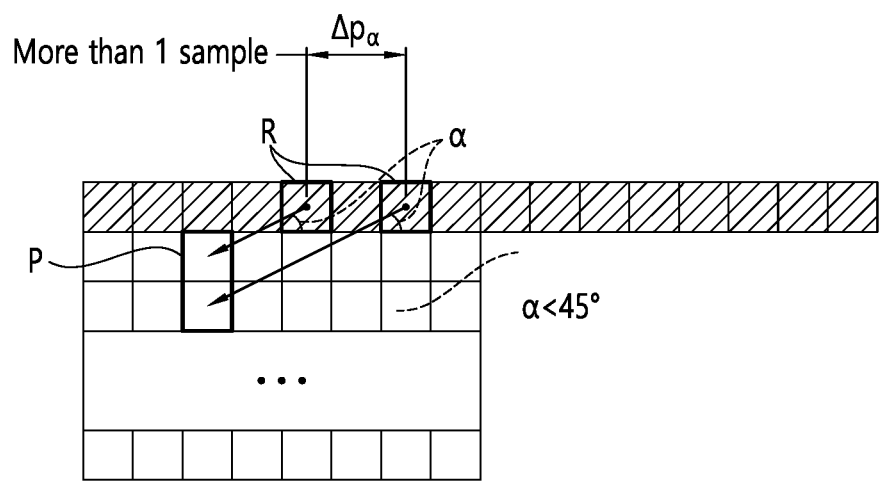
FIG. 9 illustrates reference samples used for intra prediction of a non-square block of FIG. 8A.

FIG. 9 illustrates reference samples used for intra prediction of the non-square block of FIG. 8A.

As illustrated in FIG. 9, when wide-angle intra prediction of less than 45 degrees is performed, two vertically adjacent prediction samples P may be predicted based on two non-adjacent reference samples R. Therefore, in order to reduce the negative effect of an increased gap Δpα, a low-pass reference sample filter and side smoothing may be applied to the wide-angle prediction.

As described above, when intra prediction is applied to a current block, neighboring reference samples to be used for intra prediction of the current block may be derived as illustrated in S510 of FIG. 5 and S710 of FIG. 7. The neighboring reference samples of the current block may include a total of 2×nH samples including samples adjacent to the left boundary of the current block having a size of nW×nH and bottom-left neighboring samples, a total of 2×nW samples including samples adjacent to the top boundary of the current block and top-right neighboring samples, and one top-left neighboring sample of the current block.

Alternatively, the neighboring reference samples of the current block may include a plurality of rows of top neighboring samples and a plurality of columns of left neighboring samples. Further, the neighboring reference samples of the current block may include a total of nH samples adjacent to the right boundary of the current block having a size of nW×nH, a total of nW samples adjacent to the bottom boundary of the current block, and one bottom-right neighboring sample of the current block.

Some of the neighboring reference samples of the current block may not yet be decoded or may be unavailable. In this case, a decoding apparatus may configure neighboring reference samples to be used for the prediction through extrapolation of available samples. The decoding apparatus may configure a pixel that is not yet decoded or is unavailable as a last available sample by updating a sample that can be used for reference to a latest sample from a bottom-left sample to a top-right reference sample.

A predictor of an encoding apparatus/decoding apparatus may derive a reference sample according to the intra prediction mode for the current block among the neighboring reference samples of the current block and may generate a prediction sample of the current block based on the reference sample.

For example, (i) the prediction sample may be derived based on averaging or interpolation of the neighboring reference samples of the current block, or (ii) the prediction sample may be derived based on a reference sample existing in a specific (prediction) direction with respect to the prediction sample among the neighboring reference samples of the current block. Case (i) may be referred to as a non-directional mode or a non-angular mode, and case (ii) may be referred to as a directional mode or an angular mode.

Further, the prediction sample may be generated through interpolation of a first neighboring sample and a second neighboring sample, which is located in the opposite direction of the prediction direction of the intra prediction mode for the current block with respect to the prediction samples of the current block, among the neighboring reference samples. This case may be referred to as linear interpolation intra prediction (LIP).

In addition, the prediction sample of the current block may be derived by deriving a temporary prediction sample of the current block based on filtered neighboring reference samples and performing a weighted sum of at least one reference sample derived according to the intra prediction mode among the existing neighboring reference samples, that is, the unfiltered neighboring reference samples, and the temporary prediction sample. This case may be referred to as position-dependent intra prediction (PDPC).

Figure 10:
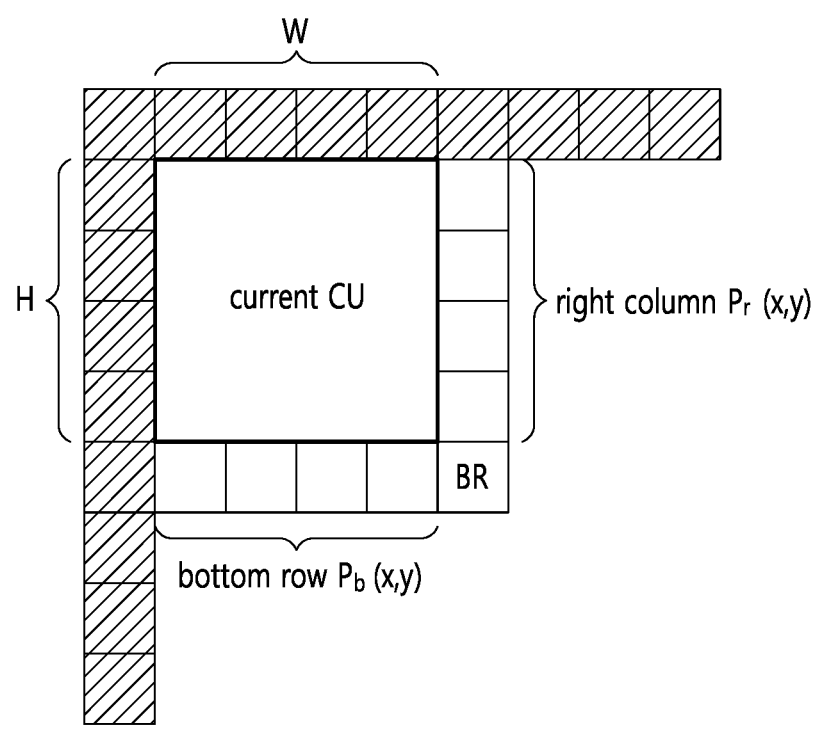
FIG. 10 illustrates neighboring samples for linear interpolation prediction according to an embodiment of the present disclosure.
Figure 11:
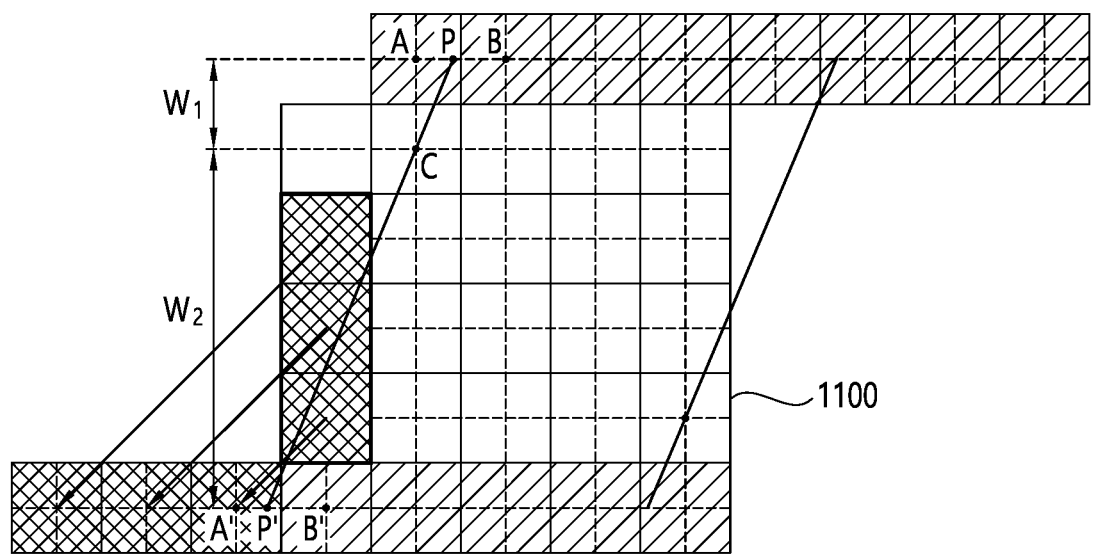
FIG. 11 is a diagram illustrating linear interpolation prediction according to an embodiment of the present disclosure.

FIG. 10 is a diagram illustrating neighboring samples for linear interpolation prediction according to an embodiment of the present disclosure, and FIG. 11 is a diagram illustrating linear interpolation prediction according to an embodiment of the present disclosure.

As illustrated in FIG. 10, the neighboring samples for linear interpolation prediction are right neighboring samples (right column Pr(x,y)) and bottom neighboring samples (bottom row Pb(x,y)) of the current block. When the neighboring samples of the current block are generated, a prediction sample C of the current block may be generated through interpolation of a first neighboring sample A, B, and P, which is positioned in the prediction direction of an intra prediction mode for the current block with respect to the prediction sample C, among the neighboring samples of the current block 1100 and a second neighboring sample A', B', and P' corresponding to the first neighboring sample among the neighboring samples, as illustrated in FIG. 11.

That is, the prediction sample may be generated through the interpolation of the second neighboring sample, which is positioned in the opposite direction of the prediction direction of the intra prediction mode for the current block with respect to the prediction sample of the current block, and the first neighboring sample. Here, the distance w1 from the prediction sample C to the first neighboring sample A, B, and P and the distance w2 from the prediction sample C to the second neighboring sample A', B', and P' may be used as weights for the linear interpolation.

Figure 12:
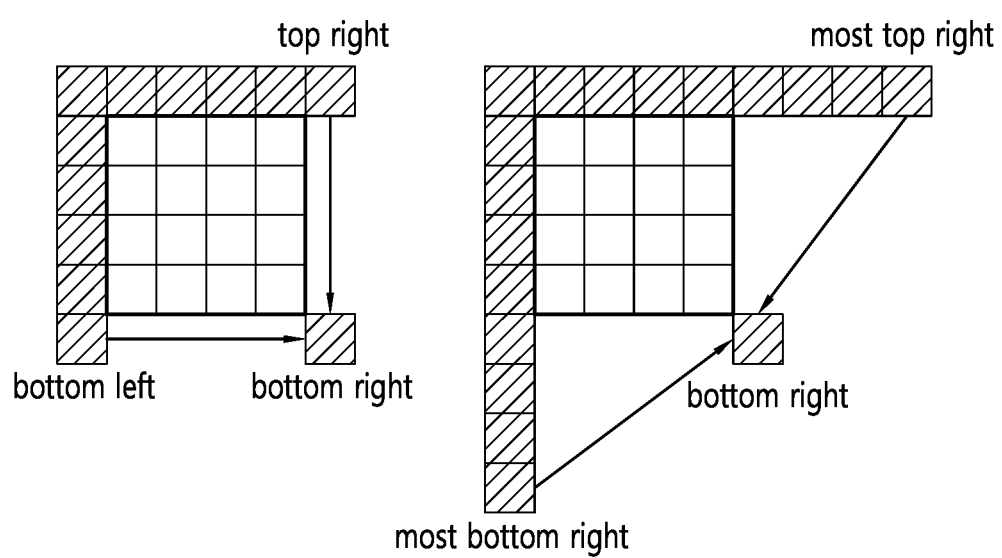
FIG. 12 is a diagram illustrating a method for generating a bottom-right sample using a neighboring reference sample according to an embodiment of the present disclosure.

FIG. 12 is a diagram illustrating a method for generating a bottom-right sample using a neighboring reference sample according to an embodiment of the present disclosure.

As described above, in order to perform linear interpolation prediction, it is necessary to generate a right sample buffer for right neighboring samples and a bottom sample buffer for bottom neighboring samples. To this end, a bottom-right (BR) sample is first generated using a neighboring reference sample.

(a) of FIG. 12 illustrates a method for generating a bottom-right sample using a top-right sample and a bottom-left sample, and (b) of FIG. 12 illustrates a method for generating the bottom-right sample using a most top-right sample and a most bottom-left sample that are distant by twice the length of a block to be currently encoded. Equations for generating the bottom-right sample using the respective samples are as follows.

Bottom-right sample=(Top-right sample+Bottom-left sample+1)>>1

Bottom-right sample=(Most top-right sample+Most bottom-left sample+1)>>1    [Equation 1]

In addition to the two methods illustrated in FIG. 12, various methods may be used as methods for generating the bottom-right sample.

When the bottom-right sample is generated, bottom samples (bottom buffer) and right samples (right buffer) may be generated using a bottom-left sample and a top-right sample.

Figure 13:
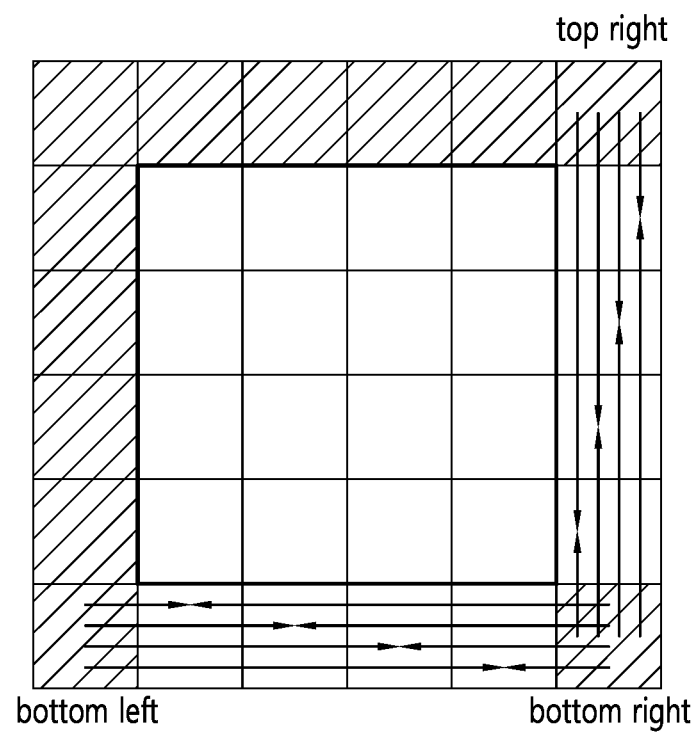
FIG. 13 illustrates a method for generating bottom samples and right samples according to an embodiment of the present disclosure.

FIG. 13 illustrates a method for generating bottom samples and right samples according to an embodiment of the present disclosure.

As illustrated in FIG. 13, bottom samples may be generated by linear interpolation of a bottom-left sample and a bottom-right sample, and right samples may be generated by linear interpolation of a top-right sample and a bottom-right sample. Here, the bottom samples, which are generated using the bottom-left sample and the bottom-right sample, and the right samples, which are generated using the top-right sample and the bottom-right sample, may be differently generated by imparting different weights depending on the positions of the bottom samples and the right samples.

After the bottom samples and the right samples are generated as illustrated in FIG. 13, linear interpolation prediction may be performed using the generated bottom samples and right samples. A method for generating the current prediction sample C of FIG. 11 using a linear interpolation intra prediction method is specified as follows. In FIG. 11, a vertical mode having a positive direction is illustrated as an example of a prediction mode.

1) To extend or construct a bottom buffer by copying left reference samples (marked with a lattice pattern and bold lines) into a bottom sample buffer, that is, to construct the bottom sample buffer using linear interpolation illustrated in FIG. 13, after which when the x-coordinate of a reference sample is out of −1 depending on a prediction angle, that is, the x-coordinate is less than −1 (samples marked with a lattice pattern), the reference sample may be padded with a previously reconstructed sample value.

2) To generate a prediction sample value P by interpolation of a reference sample A and a reference sample B in a top reference buffer using a reconstructed value (using an existing prediction sample generation method of intra encoding)

3) To generate a prediction sample value P' by interpolation of a reference sample A' and a reference sample B' in a newly generated bottom reference buffer (using the existing prediction sample generation method of intra encoding)

4) To generate a final prediction value C by linear interpolation of generated P and P'

The prediction value C may be expressed as the following equation.

$$C=(w_1*P+w_2*P'+(w_1+w_2)/2)/(w_1+w_2) \quad \text{[Equation 2]}$$

A prediction value may be generated by applying a method of 1) to 4) to all samples in a block to be currently encoded and decoded. A linear interpolation intra prediction method may be applied to all directional modes excluding the planar mode and the DC mode, which have no direction.

PDPC is an intra prediction method in which filtered reference samples are derived by performing filtering based on a filter for PDPC described above, a temporary prediction sample of a current block is derived based on an intra prediction mode for the current block and the filtered reference samples, and a prediction sample of the current block is derived by performing a weighted sum of at least one reference sample derived according to the intra prediction mode using existing reference samples, that is, unfiltered reference samples, and the temporary prediction sample.

Here, the predefined filter may be one of five 7-tap filters. Alternatively, the predefined filter may be one of a 3-tap filter, a 5-tap filter, and a 7-tap filter. The 3-tap filter, the 5-tap filter, and the 7-tap filter may be a filter having three filter coefficients, a filter having five filter coefficients, and a filter having seven filter coefficients, respectively.

A prediction sample based on an intra mode may be additionally modified by PDPC, and the result of prediction by the intra planar mode may also be further modified by PDPC.

Alternatively, in an example, PDPC may be applied, without separate signaling, to the intra planar mode, the intra DC mode, the horizontal intra prediction mode, the vertical intra prediction mode, an intra prediction mode in a bottom-left direction (i.e., intra prediction mode 2), eight directional intra prediction modes adjacent to the intra prediction mode in the bottom-left direction, an intra prediction mode in a top-right direction, and eight directional intra prediction modes adjacent to the intra prediction mode in the top-right direction.

Specifically, when PDPC is applied, a prediction sample of coordinates (x, y) predicted based on an intra prediction mode and a linear combination of reference samples may be derived by the following equation.

$$\text{pred}(x,y)=(wL \times R_{-1,y}+wT \times R_{x,-1}-wTL \times R_{-1,-1}+(64-wL-wT+wTL) \times \text{pred}(x,y)+32)>>6 \quad \text{[Equation 3]}$$

$R_{x,-1}$ and $R_{-1,y}$ respectively denote a top reference sample positioned on top of the current prediction sample corresponding to the coordinates (x, y) and a left reference sample positioned on the left of the current prediction sample, and $R_{-1,-1}$ denotes a top-left reference sample positioned on the top-left corner of the current block. Further, wL, wT, and wTL are weights applied to the left reference sample, the top reference sample, and the top-left reference sample.

When PDPC is applied to the intra planar mode, the DC mode, the horizontal intra prediction mode, and the vertical intra prediction mode, additional boundary filters, such as a DC—mode boundary filter or a vertical/horizontal-mode edge filter for existing HEVC, may not be required.

FIG. 14 is a diagram illustrating reference samples for PDPC according to an embodiment of the present disclosure. FIG. 14 illustrates reference samples ($R_{x,-1}$, $R_{-1,y}$, and $R_{-1,-1}$) defined in PDPC to be applied to various prediction modes. Specifically, in FIG. 14, (a) illustrates a reference sample for a diagonal top-right mode, (b) illustrates a reference sample for a diagonal bottom-left mode, (c) illustrates a reference sample for an adjacent diagonal top-right mode, and (d) illustrates a reference sample for an adjacent diagonal bottom-left mode.

Weights for the PDPC may be derived based on prediction modes. The weights for the PDPC may be derived as shown in the following table.

TABLE 3

| Prediction modes | wT | wL | wTL |
|---|---|---|---|
| Diagonal top-right | 16 >> ((y' << 1) >> shift) | 16 >> ((x' << 1) >> shift) | 0 |
| Diagonal bottom-left | 16 >> ((y' << 1) >> shift) | 16 >> ((x' << 1) >> shift) | 0 |
| Adjacent diagonal top-tight | 32 >> ((y' << 1) >> shift) | 0 | 0 |
| Adjacent diagonal bottom-left | 0 | 32 >> ((x' << 1) >> shift) | 0 |

In Table 3, x' and y' denote the coordinates of a pixel to which a filter is to be applied, as shown in FIG. 14.

Position-dependent intra prediction combination (PDPC) generates a prediction sample using a reference sample according to a prediction mode and then improves the prediction sample using a neighboring reference sample. Instead of being applied to all intra prediction modes, PDPC may be restrictively applied to the planar mode, the DC mode, mode 2 (bottom-right directional mode), mode 34 (top-left directional mode), mode 18 (horizontal mode), mode 50 (vertical mode), modes adjacent to mode 2 (modes 3 to 10), and modes adjacent to mode 34 (modes 58 to 65) based on the 65 directional intra prediction modes of FIG. 4A and FIG. 4B.

Further, instead of being applied to all prediction samples in the block to be currently encoded and decoded, PDPC may be variably or selectively applied in view of the size of the block.

When the prediction sample of the current block is generated through interpolation of reference samples as described above, an interpolation filter for the interpolation may be derived by various methods.

In addition, after intra prediction is performed, a filter for alleviating a block boundary may be applied to the prediction sample in order to reduce an error between the prediction sample of the current block and a previously reconstructed neighboring sample. Whether to apply this post-processing filter and the type of the filter may be determined according to the prediction mode and/or the size of the block.

Hereinafter, a reference sample derivation size in neighboring reference sample derivation will be described.

Figure 15:
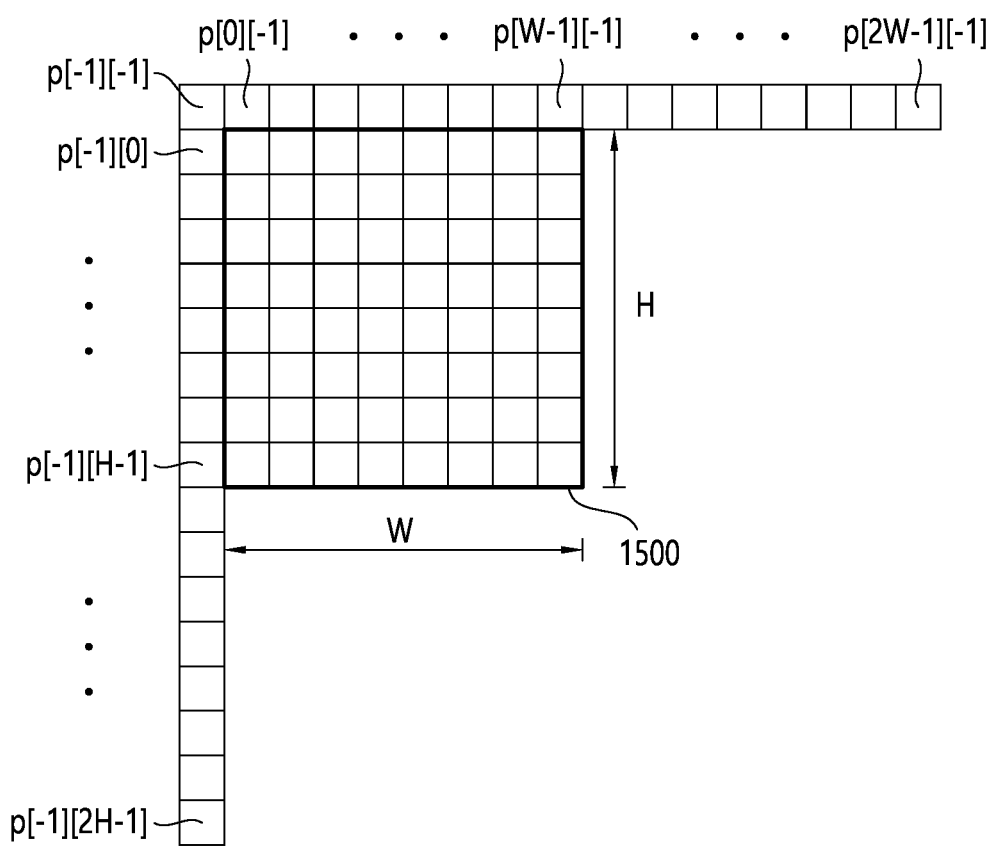
FIG. 15 is a diagram illustrating a method for constructing a reference sample according to an embodiment of the present disclosure.

FIG. 15 is a diagram illustrating a method for constructing a reference sample according to an embodiment of the present disclosure.

Referring to FIG. 15, left neighboring samples p[−1][2H−1], p[−1][0], a top-left neighboring sample p[−1][−1], and top neighboring samples p[0][−1], . . . , p[2W−1][−1] may be derived as neighboring (reference) samples for intra prediction of a current block 1500. Here, p[m][n] denotes a sample (or pixel) at a sample position (m, n), and may denote a relative sample when considering the top-left sample position of the current block as (0, 0). W and H denote the width and the height of the current block 1500, respectively. In the present disclosure, W may be interchangeably used with nW, and H may be interchangeably used with nH.

When there is a sample unavailable for intra prediction among the neighboring samples p[−1][2H−1], . . . , p[−1][−1], . . . , p[2W−1][−1], the unavailable sample may be replaced with an available sample through a substitution or padding procedure. In this case, for example, the unavailable sample may be substituted or padded with another neighboring sample adjacent to the sample.

For example, when the position of a neighboring sample deviates from a current picture or a current slice/tile/LCU in which the current block is positioned, the neighboring reference sample may be considered unavailable. In another example, when another CU including the corresponding sample has not yet been coded/reconstructed, the sample may be an unavailable sample.

The substitution or padding procedure described above may be performed, for example, in the following order.

1) When a neighboring sample p[−1][2H−1] is unavailable, neighboring samples from p[−1][2H−1] (or p[−1][2H−2]) to p[−1][−1] and then from p[0][−1] to p[2W−1][−1] may be sequentially searched, and the value of a first found available neighboring sample may be assigned to a neighboring sample p[−1][2N−1].

2) A search may be sequentially performed from x=−1 and y=2N−2 to x=−1 and y=−1, and when p[x][y] is unavailable, the value of p[x][y+1] may be substituted for the value of unavailable p[x][y].

3) A search may be sequentially performed from x=0 and y=−1 to x=2N−1 and y=−1, and when p[x][y] is unavailable, the value of p[x−1][y] may be substituted for the value of unavailable p[x][y].

FIG. 16 illustrates a neighboring sample for reference in bilinear interpolation according to an embodiment of the present disclosure.

An interpolation filter for intra prediction generally used is a bilinear filter and is used to derive a prediction sample based on a virtual reference sample corresponding to the position of a fractional sample (or sub pel) in 1/32 units existing between two integer samples (integer pels). The position of the reference sample corresponding to the fractional sample may be a position indicated by an intra prediction direction based on the position of a target sample to be predicted, that is, a prediction sample, in the current block.

Here, a process for deriving reference samples corresponding to the positions of the two integer samples is necessary, and a fractional sample between 2*width−1 and 2*width or a fractional samples between 2*height−1 and 2*height may be needed in a worst case when considering the intra prediction angle. In consideration of this aspect, up to 2*width+2*height+1 reconstructed samples may be designated as reference samples or may be stored in a separate buffer. Here, since width and height correspond to the number of samples, the total number of reference samples is 2*width+2*height plus one top-left sample.

Figure 17:
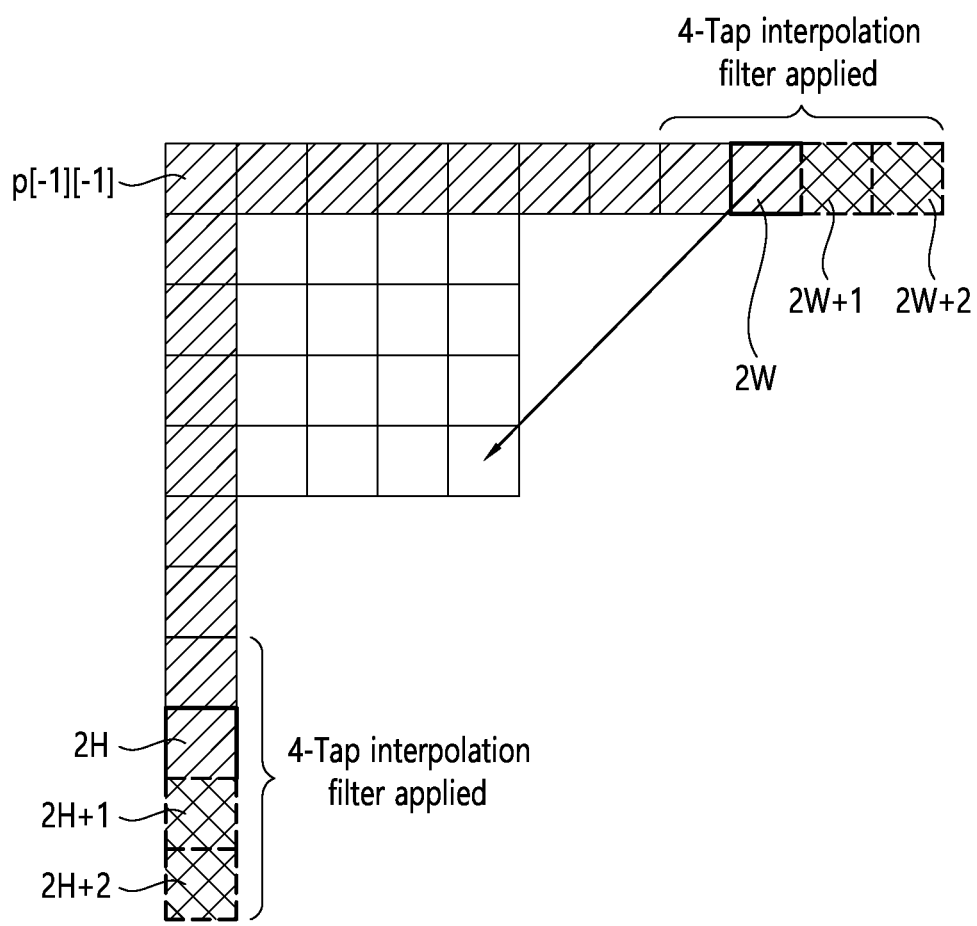
FIG. 17 illustrates a neighboring sample for reference in 4-tap interpolation according to an embodiment of the present disclosure.

FIG. 17 illustrates a neighboring sample for reference in 4-tap interpolation according to an embodiment of the present disclosure.

When interpolation is performed using a greater number of pixels than that for the bilinear filter of FIG. 16 in order to more accurately predict a sub pel, a greater number of prediction samples than 2*height and 2*width may be needed. In an example, when a reference sample is interpolated using a filter of a 4-tap size rather than a bilinear filter, four reference samples at positions of 2*width−1, 2*width, 2*width+1, and 2*width+2 may be needed in a specific situation, for example, when a prediction mode is mode 65 or 66 and the x coordinate of a prediction sample is W−1 (i.e., the rightmost sample in a block to be predicted). In this case, according to the embodiment of the present disclosure, the reference sample at the position of 2*width may be copied, that is, padded, in order to utilize the 4-tap interpolation filter.

Alternatively, when the prediction mode is mode 2 or 3 and the y coordinate of the prediction sample is H−1 (i.e., the bottommost sample in the block to be predicted), four reference samples at positions of 2*height−1, 2*height, 2*height+1, and 2*height+2 may be needed. In this case, according to the embodiment of the present disclosure, the reference sample at the position of 2*height may be copied, that is, padded, in order to utilize the 4-tap interpolation filter.

The foregoing reference sample generation method is summarized as follows.

When the position of a reference sample indicated by a prediction direction of a directional prediction mode from the position of a prediction sample is the position of a fractional sample, the prediction sample may be derived based on interpolation of specific neighboring reference samples located adjacent to the position of the fractional sample among neighboring reference samples. Here, when the specific neighboring reference samples include outer neighboring reference samples at positions of (2*nW+1, −1) and (2*nW+2, −1), the values of the outer neighboring reference samples may be set to be the same as a value of a sample of (2*nW, −1). That is, when the outer neighboring reference samples are extended from existing 2*width and added, the values of the added reference samples may be set to be the same as the value of the sample of (2*nW, −1). Here, nW is the width, that is, the breadth, of a current block.

Alternatively, when the position of a reference sample indicated by a prediction direction of a directional prediction mode from the position of a prediction sample is the position of a fractional sample, the prediction sample may be derived based on interpolation of specific neighboring reference samples located adjacent to the position of the fractional sample among neighboring reference samples. Here, when the specific neighboring reference samples include outer neighboring reference samples at positions of (−1, 2*nH+1) and (−1, 2*nH+2), the values of the outer neighboring reference samples may be set to be the same as a value of a sample of (−1, 2*nH). That is, when the outer neighboring reference samples are extended from existing 2*height and added, the values of the added reference samples may be set to be the same as the value of the sample of (−1, 2*nH). Here, nW is the height of a current block.

According to an embodiment of the present disclosure, when a plurality of reference sample lines is used in intra prediction, index information indicating any one of the plurality of reference sample lines may be reflected in an additional reference sample value. For example, a reference sample value added corresponding to the reference sample line may be set to (2*nW, −1−reference sample line index) or (−1−reference sample line index, 2*nH).

FIG. 18 illustrates a neighboring sample for reference in 4-tap interpolation according to another embodiment of the present disclosure.

According to the other embodiment of the present disclosure, a line buffer storing previously reconstructed neighboring samples may be used for interpolation of a reference sample. The line buffer may store reference samples having a width corresponding to the width of an image. Therefore, in a case where a block divided according to the boundary or binary-tree (BT)/ternary-tree (TT) structure of the image has a block index other than 0 or in a case other than a specific constraint (constraint intra: a neighboring prediction sample is used as a reference sample only when the prediction block is reconstructed by intra prediction), the line buffer may always be used. According to the present embodiment, a reference sample may be derived in view of the size of an intra interpolation filter in order to utilize accurate information that an encoding apparatus and a decoding apparatus have already had.

As illustrated in FIG. 18, there are samples for reference in reference sample interpolation among reconstructed neighboring samples designated as reference samples or separately stored. When a 4-tap interpolation filter is used, reconstructed samples A and B that are not previously designated as reference samples may be needed. In FIG. 18, among the reconstructed samples A and B that are not previously designated as reference samples, the reconstructed sample A may be used for reference when performing reference sample interpolation.

The position of a fractional sample denotes a value in decimals and may be expressed as an integer by error minimization and upscaling by a specific number to facilitate calculations in order to achieve computational convenience and minimize division. For example, when a scale unit is set to 32 and the position of a 1/32 sub pel upscaled by 32 is a, interpolation may be performed using p[FLOOR (a/scale)][−1] and p[FLOOR(a/scale)+1][−1] (FLOOR means dropping) in order to calculate a sub pel [p/32][−1].

When interpolation is performed with only two samples using a bilinear filter as in derivation of a neighboring reference sample described with reference to FIG. 16, a top reconstructed sample p[x][−1] (x=−1, 0, 1, . . . , 2*nW) and a left reconstructed sample p[−1][y] (y=−1, 0, 1, . . . , 2*nH) are used as reference samples, which can be used in all existing intra prediction modes.

However, when interpolation is performed using reference samples of a filter size of 2 or greater, a top reference sample and a left reference sample need to be extended by p[2*nW+N][−1] and p[−1][2*nH+N]. Here, N is variable according to the filter size and may be derived as follows.

$$N = (\text{filterSize} \gg 1) - 1 \qquad \text{[Equation 4]}$$

In Equation 4, filterSize denotes the size of a filter. In a case of a bilinear interpolation filter, filterSize may be 2, and in a case of a 4-tap interpolation filter, filterSize may be 4.

As described above, neighboring reference samples of a current block for intra prediction may be derived, and the derived reference samples may include top reference samples and left reference samples. The top reference samples may include 2*nW+N (integer) samples that start after a top-left sample of the current block and are positioned in a right direction in the same row as the top-left sample, and the left reference samples may include 2*nH+N (integer) samples that start after the top-left sample and are positioned in a downward direction in the same column as the top-left sample. Here, N may be determined based on Equation 4. In this case, the neighboring reference samples derived for the intra prediction of the current block may include p[−1][2nH+N−1], . . . , p[−1][−1], . . . , p[2nW+N−1][−1].

Further, in an example, when the neighboring reference samples are positioned in a previously reconstructed neighboring block within a current picture, the neighboring reference samples may have corresponding reconstructed sample values. When a neighboring (reference) sample is unavailable, the value thereof may be derived based on a substitution or padding procedure.

The substitution or padding procedure described above may be performed, for example, in the following order.

1) When a neighboring sample p[−1][2nH+N−1] is unavailable, neighboring samples from p[−1][2nH+N−1] (or p[−1][2nH+N−2]) to p[−1][−1] and then from p[0][−1] to p[2nW+N−1][−1] may be sequentially searched, and the value of a first found available neighboring sample may be assigned to a neighboring sample p[−1][2nH+N−1].

2) A search may be sequentially performed from x=−1 and y=2nH−2 to x=−1 and y=−1, and when p[x][y] is unavailable, the value of p[x][y+1] may be substituted for the value of unavailable p[x][y].

3) A search may be sequentially performed from x=0 and y=−1 to x=2nW+N−1 and y=−1, and when [x][y] is unavailable, the value of p[x−1][y] may be substituted for the value of unavailable p[x][y].

In addition, according to an example of the present disclosure, when deriving neighboring reference samples of a current block for intra prediction, a neighboring reference sample size (the number and/or positions of neighboring reference samples) may be determined based on the size of an interpolation filter for the intra prediction. In this case, the number and positions of the neighboring reference samples may be determined based on the size of the current block as well as the size of the interpolation filter.

When the interpolation filter is used, intra prediction may be performed after performing interpolation by optimizing use of samples that are previously reconstructed and are available, thereby enabling more accurate prediction and thus improving encoding and decoding efficiency.

Figure 19:
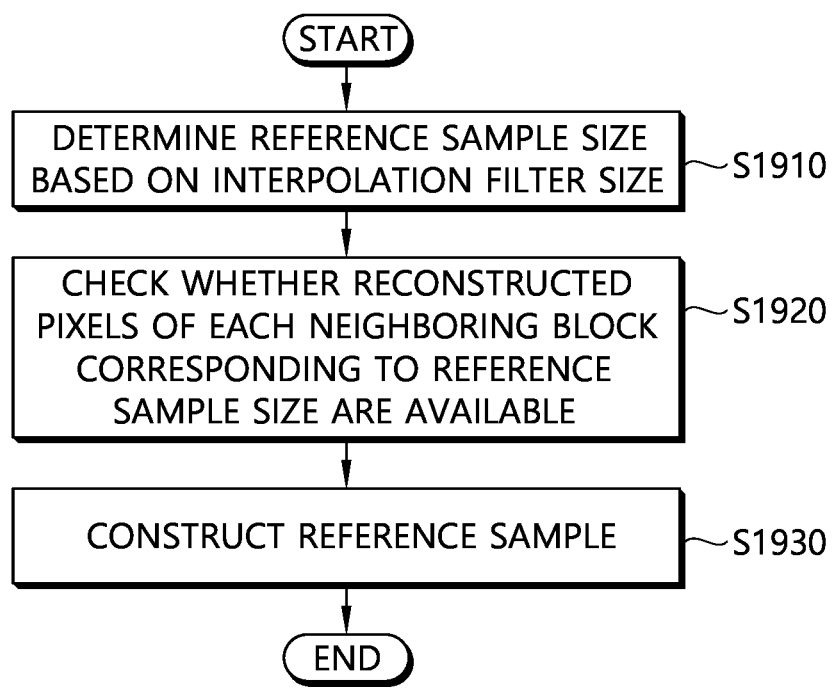
FIG. 19 is a control flowchart illustrating a method for deriving a reference sample by an encoding apparatus and a decoding apparatus according to the present disclosure.

FIG. 19 is a control flowchart illustrating a method for deriving a reference sample by an encoding apparatus and a decoding apparatus according to the present disclosure. Operations of FIG. 19 may be performed by a predictor in the encoding apparatus and the decoding apparatus, more specifically, by a reference sample deriver that sets, generates, interpolates, pads, or substitutes a reference sample in the predictor.

As illustrated, first, the predictor or the reference sample deriver may determine the size of a reference sample based on the size of an interpolation filter (S1910).

That is, as described above, the number and positions of neighboring reference samples may be determined based on the size of a current block as well as the size of the interpolation filter.

When the size of the reference sample is determined, the predictor or the reference sample deriver checks whether a reconstructed pixel of each neighboring block corresponding to the size of the reference sample is available (S1920).

That is, it may be determined whether samples of the neighboring block are reconstructed and/or available corresponding to the size of the reference sample. When the position of a neighboring sample is out of a current picture or is out of a current slice/tile/LCU in which the current block is positioned or when another CU including this sample has not yet been coded/reconstructed, the neighboring reference sample may be considered unavailable, that is, the reconstructed pixel may be determined to be unavailable.

The predictor or the reference sample deriver may construct the reference sample using the reconstructed pixel of which availability is identified (S1930).

Figure 20:
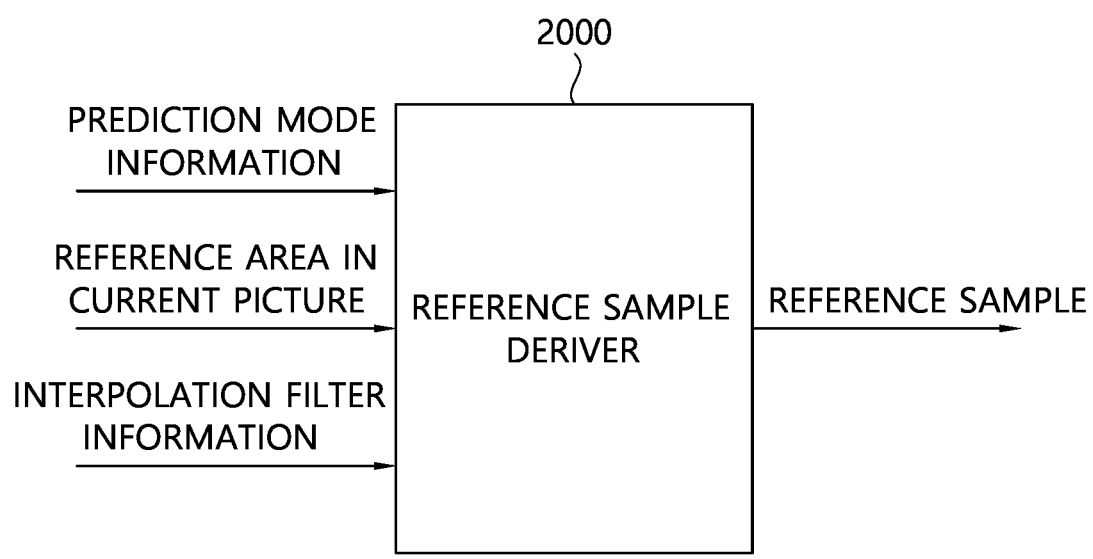
FIG. 20 is a diagram illustrating a reference sample deriver according to an encoding apparatus and a decoding apparatus of the present disclosure.

FIG. 20 is a diagram illustrating a reference sample deriver according to an encoding apparatus and a decoding apparatus of the present disclosure.

The reference sample deriver 2000 of FIG. 20 may perform the operation of FIG. 18. As illustrated, the reference sample deriver 2000 may receive information on a prediction mode, information on a reference block used for reference for a current block in a current picture, and information on an interpolation filter, and may derive a reference sample using the information.

Figure 21:
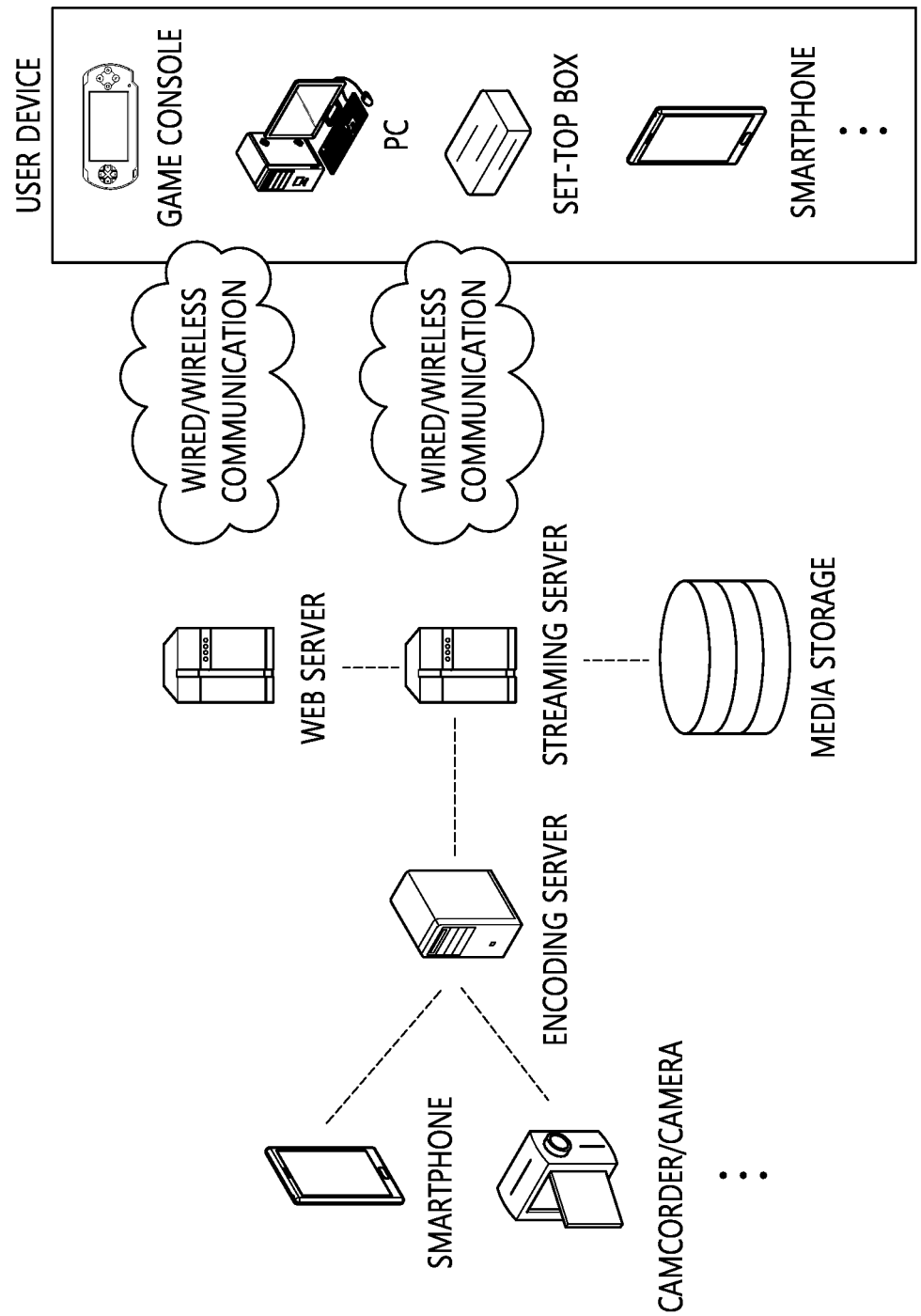
FIG. 21 illustrates an example of a contents streaming system to which the present disclosure may be applied.

FIG. 21 illustrates an example of a contents streaming system to which the present disclosure may be applied.

Referring to FIG. 21, the content streaming system to which the present disclosure is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the present disclosure is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. An image decoding method performed by a decoding apparatus, the method comprising:
   deriving an intra prediction mode for a current block;
   deriving neighboring reference samples of the current block;
   generating a prediction sample for the current block based on the intra prediction mode and the neighboring reference samples; and
   generating a reconstructed picture for the current block based on the prediction sample,
   wherein the intra prediction mode for the current block is a directional prediction mode;
   wherein based on a position indicated by a prediction direction of the directional prediction mode with regard to a position of the prediction sample being a position of a fractional sample, the prediction sample is derived based on interpolation of specific neighboring reference samples located neighboring the position of the fractional sample,
   wherein the specific neighboring reference samples are included in the neighboring reference samples,
   wherein the interpolation of the specific neighboring reference samples is performed based on an interpolation filter,
   wherein based on the specific neighboring reference samples comprising an outer neighboring reference sample located to a right of a position of (2W−1, −1) or located below a position of (−1, 2H−1), a reconstructed sample value of the outer neighboring reference sample is used for the interpolation,
   wherein W is a width of the current block and H is a height of the current block,
   wherein the neighboring reference samples include top neighboring reference samples, a position of a rightmost reference sample among the top neighboring reference samples is determined based on a filter tap size of the interpolation filter, and wherein the position of the right-most reference sample is (2W+N−1, −1), wherein N is determined based on a following equation:

$$N=(filterSize \gg 1)-1$$

where filterSize represents the filter tap size and ≫ represents arithmetic right shift.

2. The image decoding method of claim 1, wherein the filter tap size is 4, and wherein the interpolation filter includes a Gaussian filter or a cubic filter.

3. The image decoding method of claim 1, wherein based on the neighboring reference samples forming a plurality of reference sample lines, the reconstructed sample value of the outer neighboring reference sample is derived based on reference sample line index information indicating one of the plurality of the reference sample lines.

4. The image decoding method of claim 1, wherein based on a position of a top-left sample position in the current block being (0, 0), a position of the outer neighboring reference sample is (2W, −1) or (−1, 2H).

5. An image encoding method performed by an encoding apparatus, the method comprising:

deriving an intra prediction mode for a current block;
deriving neighboring reference samples of the current block;
generating a prediction sample for the current block based on the intra prediction mode and the neighboring reference samples;
generating information on the intra prediction mode; and encoding the information on the intra prediction mode,
wherein the intra prediction mode for the current block is a directional prediction mode;
wherein based on a position indicated by a prediction direction of the directional prediction mode with regard to a position of the prediction sample being a position of a fractional sample, the prediction sample is derived based on interpolation of specific neighboring reference samples located neighboring the position of the fractional sample,
wherein the specific neighboring reference samples are included in the neighboring reference samples,
wherein the interpolation of the specific neighboring reference samples is performed based on an interpolation filter,
wherein based on the specific neighboring reference samples comprising an outer neighboring reference sample located to a right of a position of (2W−1, −1) or located below a position of (−1, 2H−1), a reconstructed sample value of the outer neighboring reference sample is used for the interpolation,
wherein W is a width of the current block and H is a height of the current block,
wherein the neighboring reference samples include top neighboring reference samples, a position of a right-most reference sample among the top neighboring reference samples is determined based on a filter tap size of the interpolation filter, and
wherein the position of the right-most reference sample is (2W+N−1, −1), wherein N is determined based on a following equation:

$$N=(filterSize \gg 1)-1$$

where filterSize represents the filter tap size and ≫ represents arithmetic right shift.

6. The image encoding method of claim 5, wherein the filter tap size is 4, and wherein the interpolation filter includes a Gaussian filter or a cubic filter.

7. The image encoding method of claim 5, wherein based on the neighboring reference samples forming a plurality of reference sample lines, the reconstructed sample value of the outer neighboring reference sample is derived based on reference sample line index information indicating one of the plurality of the reference sample lines.

8. The image encoding method of claim 5, wherein based on a position of a top-left sample position in the current block being (0, 0), a position of the outer neighboring reference sample is (2W, −1) or (−1, 2H).

9. A non-transitory computer-readable storage medium storing a bitstream generated by a method, the method comprising:

deriving an intra prediction mode for a current block;
deriving neighboring reference samples of the current block;
generating a prediction sample for the current block based on the intra prediction mode and the neighboring reference samples; and
generating the bitstream by encoding information on the intra prediction mode,
wherein the intra prediction mode for the current block is a directional prediction mode;
wherein based on a position indicated by a prediction direction of the directional prediction mode with regard to a position of the prediction sample being a position of a fractional sample, the prediction sample is derived based on interpolation of specific neighboring reference samples located neighboring the position of the fractional sample,
wherein the specific neighboring reference samples are included in the neighboring reference samples,
wherein the interpolation of the specific neighboring reference samples is performed based on an interpolation filter,
wherein based on the specific neighboring reference samples comprising an outer neighboring reference sample located to a right of a position of (2W−1, −1) or located below a position of (−1, 2H−1), a reconstructed sample value of the outer neighboring reference sample is used for the interpolation,
wherein W is a width of the current block and H is a height of the current block,
wherein the neighboring reference samples include top neighboring reference samples, a position of a right-most reference sample among the top neighboring reference samples is determined based on a filter tap size of the interpolation filter, and
wherein the position of the right-most reference sample is (2W+N−1, −1), wherein N is determined based on a following equation:

$$N=(filterSize \gg 1)-1$$

where filterSize represents the filter tap size and ≫ represents arithmetic right shift.

10. The non-transitory computer-readable storage medium of claim 9, wherein based on a position of a top-left sample position in the current block being (0, 0), a position of the outer neighboring reference sample is (2W, −1) or (−1, 2H).

* * * * *